(12) United States Patent  (10) Patent No.: US 8,452,121 B2
Kanai  (45) Date of Patent: May 28, 2013

(54) IMAGE PROCESSOR, IMAGE DISPLAY DEVICE, AND IMAGE PROCESSING METHOD

(75) Inventor: Masashi Kanai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 863 days.

(21) Appl. No.: 12/603,200

(22) Filed: Oct. 21, 2009

(65) Prior Publication Data

US 2010/0119150 A1    May 13, 2010

(30) Foreign Application Priority Data

Nov. 13, 2008 (JP) ................. 2008-290664

(51) Int. Cl.
*G06K 9/40* (2006.01)
*G06K 9/00* (2006.01)
*G09G 5/02* (2006.01)
*H04N 5/64* (2006.01)

(52) U.S. Cl.
USPC ............ 382/274; 382/167; 345/589; 348/744

(58) Field of Classification Search
USPC ............ 382/274, 254, 167; 345/589; 348/744
See application file for complete search history.

(56) References Cited

U.S. PATENT DOCUMENTS

| 6,701,024 | B1 * | 3/2004 | Sasai ............................ 382/260 |
| 7,710,474 | B2 * | 5/2010 | Hatano ......................... 348/252 |
| 7,903,148 | B2 | 3/2011 | Yokoyama et al. |
| 2003/0020725 | A1 * | 1/2003 | Matsuda ....................... 345/600 |

FOREIGN PATENT DOCUMENTS

| JP | A-2004-266755 | 9/2004 |
| JP | A-2007-208399 | 8/2007 |
| JP | A-2007-306505 | 11/2007 |

* cited by examiner

*Primary Examiner* — Yon Couso
(74) *Attorney, Agent, or Firm* — Oliff & Berridge, PLC

(57) ABSTRACT

An image processor that corrects an image signal, includes: a frequency analysis section that analyzes a spatial frequency of a luminance component of the image signal; a luminance component correction amount calculating section that calculates an amount of correction of the luminance component of the image signal according to the analysis result of the frequency analysis section only for an image signal in a predetermined luminance level range of a predetermined spatial frequency band; and a luminance component correcting section that corrects the luminance component of the image signal by using the amount of correction calculated by the luminance component correction amount calculating section.

13 Claims, 25 Drawing Sheets

| OUTPUT OF HPF CIRCUIT | $\alpha$ HPF | $\alpha$ LPF |
|---|---|---|
| highYa | $\alpha$ HPFa | $\alpha$ LPFa |
| highYb | $\alpha$ HPFb | $\alpha$ LPFb |
| highYc | $\alpha$ HPFc | $\alpha$ LPFc |
| | | |

FIG. 7

| OUTPUT OF HPF CIRCUIT | BRIGHTNESS GAIN |
|---|---|
| highYa | fa |
| highYb | fb |
| highYc | fc |
| ⋯ | ⋯ |

FIG. 12

| OUTPUT OF HPF CIRCUIT | WEIGHT COEFFICIENT | | |
|---|---|---|---|
| highYa | g1a | g2a | g3a |
| highYb | g1b | g2b | g3b |
| highYc | g1c | g2c | g3c |
| ...... | ...... | ...... | ...... |

| INPUT BRIGHTNESS SIGNAL | OUTPUT OF HPF CIRCUIT | BRIGHTNESS GAIN |
|---|---|---|
| Ya | highYa | j1a |
| Ya | highYb | j1b |
| ⋮ | ⋮ | ⋮ |
| Yb | highYa | j1c |
| Yb | highYb | j1d |
| ⋮ | ⋮ | ⋮ |
| Yc | highYc | j1e |
| ⋮ | ⋮ | ⋮ |

FIG. 22B

| INPUT BRIGHTNESS SIGNAL | OUTPUT OF HPF CIRCUIT | BRIGHTNESS GAIN |
|---|---|---|
| Ya | highYa | j2a |
| Ya | highYa | j2b |
| ⋮ | ⋮ | ⋮ |
| Yb | highYb | j2c |
| Yb | highYb | j2d |
| ⋮ | ⋮ | ⋮ |
| Yc | highYc | j2e |
| ⋮ | ⋮ | ⋮ |

FIG. 22C

| INPUT BRIGHTNESS SIGNAL | OUTPUT OF HPF CIRCUIT | BRIGHTNESS GAIN |
|---|---|---|
| Ya | highYa | j3a |
| Ya | highYa | j3b |
| ⋮ | ⋮ | ⋮ |
| Yb | highYb | j3c |
| Yb | highYb | j3d |
| ⋮ | ⋮ | ⋮ |
| Yc | highYc | j3e |
| ⋮ | ⋮ | ⋮ |

| INPUT BRIGHTNESS SIGNAL | OUTPUT OF HPF CIRCUIT | FILTER OUTPUT | | | OUTPUT OF AMOUNT OF CORRECTION |
|---|---|---|---|---|---|
| Ya | highYa | FO1a | FO2a | FO3a | VAa |
| Ya | highYa | FO1a | FO2a | FO3b | VAb |
| ⋮ | ⋮ | ⋮ | ⋮ | ⋮ | ⋮ |
| Ya | highYb | FO1a | FO2a | FO3a | VAc |
| Ya | highYb | FO1a | FO2a | FO3b | VAd |
| ⋮ | ⋮ | ⋮ | ⋮ | ⋮ | ⋮ |
| Yb | highYc | FO1a | FO2b | FO3c | VAe |
| Yb | highYc | FO1a | FO2b | FO3d | VAf |
| ⋮ | ⋮ | ⋮ | ⋮ | ⋮ | ⋮ |

FIG. 24

IMAGE PROCESSOR, IMAGE DISPLAY DEVICE, AND IMAGE PROCESSING METHOD

BACKGROUND

1. Technical Field

The present invention relates to an image processor, an image display device, and an image processing method.

2. Related Art

In recent years, as the number of gray levels or the dynamic range of image contents increases, some dark or bright portions of a display image cannot be expressed due to insufficient contrast in a display device. Accordingly, the cases are increasing where the detail in dark or bright portions cannot be completely reproduced. In order to express such detail in the dark or bright portions, image-adaptive gray level correction processing called monochrome extension is performed.

FIG. 25 is a view for explaining the gray level correction processing. FIG. 25 schematically shows the characteristic of an image expressed by each image signal under gray level correction processing, where the horizontal axis indicates the horizontal position of the image and the vertical axis indicates the luminance level.

An input image IMG1 is an image with low luminance (low gray level) at the left side and high luminance (high gray level) at the right side. In the input image IMG1, there is a small gray level change both in the region where the luminance is low and the region where the luminance is high. When performing the gray level correction processing on the input image IMG1, gray level correction is performed according to a gamma correction curve which is convex upward so that the overall luminance is increased, as shown in FIG. 25. As a result, in an output image IMG2 after the gray level correction, luminance has increased over the whole screen. Accordingly, the luminance has increased in the left low-luminance region, but the average luminance also increases in the low-luminance regions.

As described above, in the known gray level correction process, a small gray level change in a dark portion can be expressed by increasing the overall luminance so that the luminance on the low gray level side is increased, for example, when the dark portion is included in the image. On the other hand, a small gray level change in a bright portion can be expressed by decreasing the overall luminance so that the luminance on the high gray level side is decreased, for example, when the bright portion is included in the image.

The technique related to such a gray level correction process is disclosed in JP-A-2004-266755, for example. JP-A-2004-266755 discloses the technique of calculating the gamma correction curve according to the average luminance of an input image and performing luminance correction of the input image according to the gamma correction curve. In the technique disclosed in JP-A-2004-266755, the luminance gain after correction increases as the average luminance of the input image decreases. In addition, when the input image is a moving image, flickering of the moving image after correction is suppressed by calculating the gamma correction curve on the basis of the linear sum of the average luminance of the screen and the average luminance of the previous frame.

In the technique disclosed in JP-A-2004-266755, however, since the luminance correction is uniformly performed on the whole screen, there is a problem that not only the detail in dark portions but also the whole of the dark portions or other luminance regions are expressed brightly. For this reason, when dark and bright portions are mixed, the detail in the dark portions can be expressed but the detail in the bright portions cannot be expressed, for example.

Moreover, in the technique disclosed in JP-A-2004-266755, since only the luminance component is corrected, the chromaticity of each pixel changes and the tendency of the colors on the whole screen accordingly changes. In this case, the quality of the image may deteriorate only with the correction of a luminance component. Accordingly, it is desirable to be able to maintain the tendency of the colors on the whole screen when expressing the detail of the image.

SUMMARY

An advantage of some aspects of the invention is that it provides an image processor, an image display device, and an image processing method capable of improving the expression of the detail of an image without affecting the other luminance regions.

An aspect of the invention is directed to an image processor that corrects an image signal, including: a frequency analysis section that analyzes a spatial frequency of a luminance component of the image signal; a luminance component correction amount calculating section that calculates an amount of correction of the luminance component of the image signal according to the analysis result of the frequency analysis section only for an image signal in a predetermined luminance level range of a predetermined spatial frequency band; and a luminance component correcting section that corrects the luminance component of the image signal by using the amount of correction calculated by the luminance component correction amount calculating section.

According to the aspect of the invention, the spatial frequency of the luminance component of the image signal is analyzed, the amount of correction of the luminance component of the image signal is calculated according to the analysis result of the spatial frequency of the luminance component only for an image signal in a predetermined luminance level range of a predetermined spatial frequency band, and the luminance component is corrected by using the amount of correction. As a result, even in the case where dark and bright portions are mixed, the image signal can be corrected such that the detail of both the dark and bright portions can be expressed without uniformly correcting the whole screen. Furthermore, since the detail of the dark portion of the image and the luminance noise can be distinguished from each other, it is possible to avoid the situation where the luminance noise is highlighted together with the detail of the dark portion.

Moreover, in the image processor according to the aspect of the invention, the frequency analysis section may include a high frequency component extracting section that extracts a predetermined high frequency component of the luminance component of the image signal, and the luminance component correction amount calculating section may include a frequency gain calculating section, which calculates a frequency gain corresponding to the high frequency component extracted by the high frequency component extracting section, and calculate the amount of correction of the luminance component on the basis of the luminance component in the predetermined luminance level range of the spatial frequency band and the frequency gain calculated by the frequency gain calculating section.

According to the aspect of the invention, predetermined high frequency component of the luminance component is extracted and the amount of correction is calculated on the basis of the frequency gain corresponding to the high frequency component and the luminance component in the predetermined luminance level range of the predetermined spatial frequency band. As a result, since the detail of the dark portion and the luminance noise can be distinguished from each other by a simple process, it is possible to avoid the situation where the luminance noise is highlighted together with the detail of the dark portion.

Moreover, in the image processor according to the aspect of the invention, the luminance signal correction amount calculating circuit may include a luminance gain calculating section, which calculates a luminance gain corresponding to the level of the luminance component of the image signal, and calculate the amount of correction of the luminance component on the basis of a signal in the spatial frequency band, the frequency gain, and the luminance gain calculated by the luminance gain calculating section.

According to the aspect of the invention, for a signal in a predetermined spatial frequency band, a signal in the level range of the predetermined luminance component can be specified by the luminance gain. As a result, the luminance component of the image signal can be corrected only for the luminance component in the predetermined luminance level range of the predetermined spatial frequency band by using a simple configuration.

Moreover, the image processor according to the aspect of the invention may further include a signal extracting section that extracts a signal in the spatial frequency band from the luminance component of the image signal.

According to the aspect of the invention, a component in the predetermined spatial frequency band can be extracted from the luminance component in the predetermined luminance level range by using a simple configuration.

Moreover, in the image processor according to the aspect of the invention, the frequency analysis section may include a luminance noise removing section that removes a predetermined luminance noise component from the luminance component of the image signal, and the luminance component correcting section may correct the luminance component of the image signal, from which the luminance noise component has been removed by the luminance noise removing section, by using the amount of correction.

According to the aspect of the invention, the luminance component of the image signal from which the luminance noise component has been removed is corrected by using the amount of correction calculated by the luminance component correcting section. As a result, the detail of both dark and bright portions can be expressed and the correction of an image signal for distinguishing the detail of the dark portion of the image from the luminance noise can be performed with high precision.

Moreover, the image processor according to the aspect of the invention may further include a color difference component correcting section that corrects a color difference component of the image signal such that the value of the xy chromaticity does not change before and after correction using the luminance component correcting section.

According to the aspect of the invention, the color difference component is corrected simultaneously with the correction of the luminance component such that the value of the xy chromaticity does not change before and after the correction of the luminance component. As a result, since it is possible to avoid the situation where the chromaticity of each pixel changes and the tendency of the overall colors on the screen accordingly changes in addition to the above-described effects, the tendency of the colors on the whole screen can be maintained when expressing the detail of the image.

Moreover, the image processor according to the aspect of the invention may further include a color difference component correction amount calculating section which calculates the amount of correction of the color difference component of the image signal such that the value of the xy chromaticity does not change, on the basis of luminance components of the image signal before and after correction using the luminance component correcting section. The color difference component correcting section may correct the color difference component of the image signal using the amount of correction of the color difference component calculated by the color difference component correction amount calculating section.

According to the aspect of the invention, the color difference component is corrected according to the amount of correction of the luminance component simultaneously with the correction of the luminance component of the image signal. As a result, correction of the image signal capable of expressing the detail of the dark or bright portions of the image becomes possible without changing the value of the xy chromaticity before and after correction of the luminance component.

Moreover, the image processor according to the aspect of the invention may further include an adjustment parameter storage section that stores an adjustment parameter of the color difference component. Assuming that the luminance component before correction is Yin, the luminance component after correction is Yout, and the adjustment parameter is b, the color difference component correcting section may correct the color difference component by multiplying the color difference component of the image signal by a color difference gain of $(1-b\times(1-Yout/Yin))$.

According to the aspect of the invention, correction of the color difference component performed simultaneously with the correction of the luminance component of the image signal can be realized by a simple process.

Furthermore, another aspect of the invention is directed to an image display device that displays an image on the basis of an image signal, including: the above-described image processor that corrects the image signal; and an image display unit that displays an image on the basis of the image signal corrected by the image processor.

According to the aspect of the invention, it is possible to provide an image display device capable of improving the expression of the detail of an image without affecting the other luminance regions.

Furthermore, still another aspect of the invention is directed to an image processing method of correcting an image signal including: analyzing a spatial frequency of a luminance component of the image signal; calculating an amount of correction of the luminance component of the image signal according to the analysis result in the analyzing of the frequency only for an image signal in a predetermined luminance level range of a predetermined spatial frequency band; and correcting the luminance component of the image signal by using the amount of correction calculated in the calculating of the amount of correction of the luminance component.

According to the aspect of the invention, the spatial frequency of the luminance component of the image signal is analyzed, the amount of correction of the luminance component of the image signal is calculated according to the analysis result of the spatial frequency of the luminance component only for an image signal in a predetermined luminance level range of a predetermined spatial frequency band, and the luminance component is corrected by using the amount of correction. As a result, even in the case where dark and bright portions are mixed, the image signal can be corrected such that the detail of both the dark and bright portions can be expressed without uniformly correcting the whole screen. Furthermore, since the detail of the dark portion of the image and the luminance noise can be distinguished from each other, it is possible to avoid the situation where the luminance noise is highlighted together with the detail of the dark portion.

Moreover, in the image processing method according to the aspect of the invention, the analyzing of the frequency may include extracting a predetermined high frequency component of the luminance component of the image signal. In the calculating of the amount of correction of the luminance component, calculating a frequency gain corresponding to the high frequency component extracted in the extracting of the high frequency component may be included, and the amount of correction of the luminance component may be calculated on the basis of the luminance component in the predetermined luminance level range of the spatial frequency band and the frequency gain calculated in the calculating of the frequency gain.

According to the aspect of the invention, a predetermined high frequency component of the luminance component is extracted and the amount of correction is calculated on the basis of the frequency gain corresponding to the high frequency component and the luminance component in the predetermined luminance level range of the predetermined spatial frequency band. As a result, since the detail of the dark portion and the luminance noise can be distinguished from each other by a simple process, it is possible to avoid the situation where the luminance noise is highlighted together with the detail of the dark portion.

Moreover, in the image processing method according to the aspect of the invention, in the calculating of the amount of correction of the luminance component, calculating a luminance gain corresponding to the level of the luminance component of the image signal may be included, and the amount of correction of the luminance component may be calculated on the basis of a signal in the spatial frequency band, the frequency gain, and the luminance gain calculated in the calculating of the luminance gain.

According to the aspect of the invention, for a signal in a predetermined spatial frequency band, a signal in the level range of the predetermined luminance component can be specified by the luminance gain. As a result, the luminance component of the image signal can be corrected only for the luminance component in the predetermined luminance level range of the predetermined spatial frequency band by using a simple configuration.

Moreover, in the image processing method according to the aspect of the invention, the analyzing of the frequency may include removing a luminance noise component from the luminance component of the image signal. In the correcting of the luminance component, the luminance component of the image signal from which the luminance noise component has been removed in the removing of the luminance noise component may be corrected by using the amount of correction.

According to the aspect of the invention, the luminance component of the image signal from which the luminance noise component has been removed is corrected by using the amount of correction calculated by the luminance component correcting section. As a result, the detail of both dark and bright portions can be expressed and the correction of an image signal for distinguishing the detail of the dark portion of the image from the luminance noise can be performed with high precision.

Moreover, the image processing method according to the aspect of the invention may further include correcting a color difference component of the image signal such that the value of the xy chromaticity does not change before and after the correcting of the luminance component.

According to the aspect of the invention, the color difference component is corrected simultaneously with the correction of the luminance component such that the value of the xy chromaticity does not change before and after the correction of the luminance component. As a result, since it is possible to avoid the situation where the chromaticity of each pixel changes and the tendency of the overall colors on the screen accordingly changes in addition to the above-described effects, the tendency of the colors on the whole screen can be maintained when expressing the detail of the image.

Moreover, the image processing method according to the aspect of the invention may further include calculating the amount of correction of the color difference component of the image signal such that the value of the xy chromaticity does not change, on the basis of luminance components of the image signal before and after the correcting of the luminance component. In the correcting of the color difference component, the color difference component of the image signal may be corrected using the amount of the correction of the color difference component calculated in the calculating of the amount of correction of the color difference component.

According to the aspect of the invention, the color difference component is corrected according to the amount of correction of the luminance component simultaneously with the correction of the luminance component of the image signal. As a result, correction of the image signal capable of expressing the detail of the dark or bright portions of the image becomes possible without changing the value of the xy chromaticity before and after the correction of the luminance component.

BRIEF DESCRIPTION OF THE DRAWINGS

The invention will be described with reference to the accompanying drawings, wherein like numbers reference like elements.

FIG. 7 is a view for explaining an operation of a weight calculating circuit.

FIG. 12 is a view for explaining an operation of a frequency gain calculating circuit in FIG. 10.

FIG. 19 is a view for explaining an operation of a weight calculating circuit in FIG. 18.

FIGS. 22A to 22C are views for explaining operations of first to third LUTs in FIG. 21.

FIG. 24 is a view for explaining an operation of an LUT in FIG. 23.

DESCRIPTION OF EXEMPLARY EMBODIMENTS

Hereinafter, embodiments of the invention will be described in detail with reference to the accompanying drawings. In addition, the embodiments described below are not intended to limit the contents of the invention defined by the appended claims. In addition, all of the configurations described below are not necessarily essential components of the invention.

Hereinafter, a projector is described as an example of an image display device of the invention. However, the image display device of the invention is not limited to the projector.

First Embodiment

Figure 1:
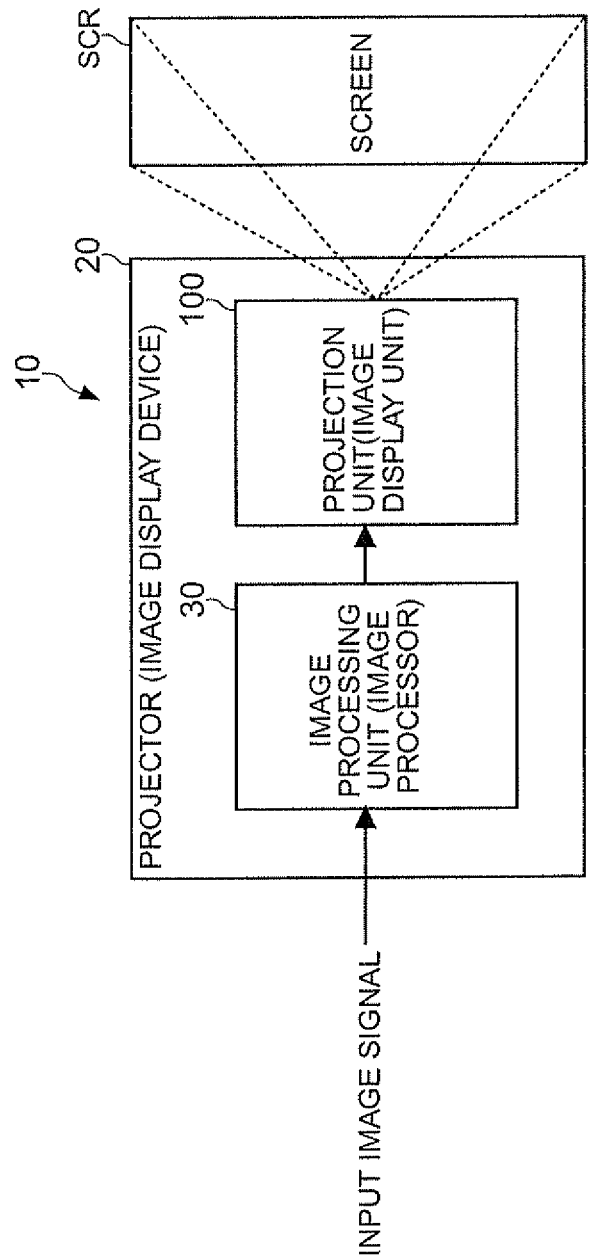
FIG. 1 is a block diagram illustrating an example of the configuration of an image display system according to a first embodiment of the invention.

FIG. 1 is a block diagram illustrating an example of the configuration of an image display system according to a first embodiment of the invention.

An image display system 10 includes a projector 20 as an image display device and a screen SCR. The projector 20 modulates light from a light source (not shown) on the basis of an input image signal and displays an image by projecting the modulated light on the screen SCR.

The projector 20 includes an image processing unit 30 (in a broad sense, an image processor) and a projection unit 100 (in a broad sense, an image display unit). The image processing unit 30 corrects an input image signal so that the detail of dark or bright portions of a display image can be expressed without affecting the other luminance regions, and outputs the corrected image signal to the projection unit 100. The projection unit 100 projects onto the screen SCR the light modulated on the basis of the image signal from the image processing unit 30.

Figure 2:
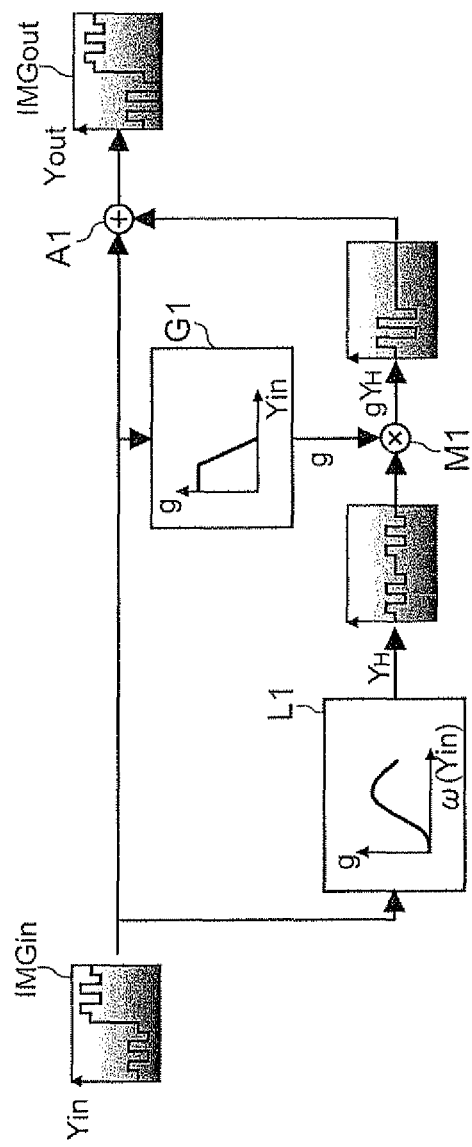
FIG. 2 is an explanatory view illustrating the gray level correction process performed in an image processing unit in FIG. 1.

FIG. 2 is an explanatory view illustrating the gray level correction processing performed in the image processing unit 30 in FIG. 1. FIG. 2 schematically shows the characteristics of an image expressed by each image signal under the gray level correction processing, where the horizontal axis indicates the horizontal position of the image and the vertical axis indicates the luminance level.

An input image IMGin is, for example, an image with low luminance (low gray level) at the left side and high luminance (high gray level) at the right side. In the input image IMGin, there is a small gray level change both in the region where the luminance is low and the region where the luminance is high. A signal extracting unit L1 extracts a signal $Y_H$ of a luminance component in a predetermined spatial frequency band from the luminance components of the image signal of the input image IMGin. In FIG. 2, the signal extracting unit L1 extracts the signal $Y_H$ of the luminance component in the spatial frequency band where the gain set corresponding to the spatial frequency of the object to be extracted is large.

In addition, a luminance gain calculating unit G1 calculates a gain coefficient g (luminance gain coefficient. In a broad sense, luminance gain; the same hereinbelow) corresponding to the level of the luminance component of the image signal of the input image. In FIG. 2, the luminance gain calculating unit G1 calculates the gain coefficient g such that it increases in a region where the level of the luminance component is low and it becomes almost 0 in a region where the level of the luminance component is high.

As a result, a multiplier M1 generates a signal $gY_H$ by multiplying the signal $Y_H$ extracted by the signal extracting unit L1 by the gain coefficient g calculated by the luminance gain calculating unit G1. The signal $gY_H$ is a signal corresponding to the amount of correction of a luminance component of an input image signal. An adder A1 adds together a luminance signal Yin and the signal $gY_H$ of the input image signal and outputs a luminance signal Yout of the image signal after the gray level correction.

In this case, in the first embodiment, a gain coefficient f (frequency gain coefficient. In a broad sense, frequency gain; the same hereinbelow) is calculated by a frequency gain calculating unit (not shown) in consideration of the amount of luminance noises included in the luminance component of the image signal of the input image IMGin and the detail of the dark portion and the luminance noise are distinguished from each other by multiplying the gain coefficient f by the signal $gY_H$, so that only the detail of the dark portion of the display image is emphasized.

Figure 3:
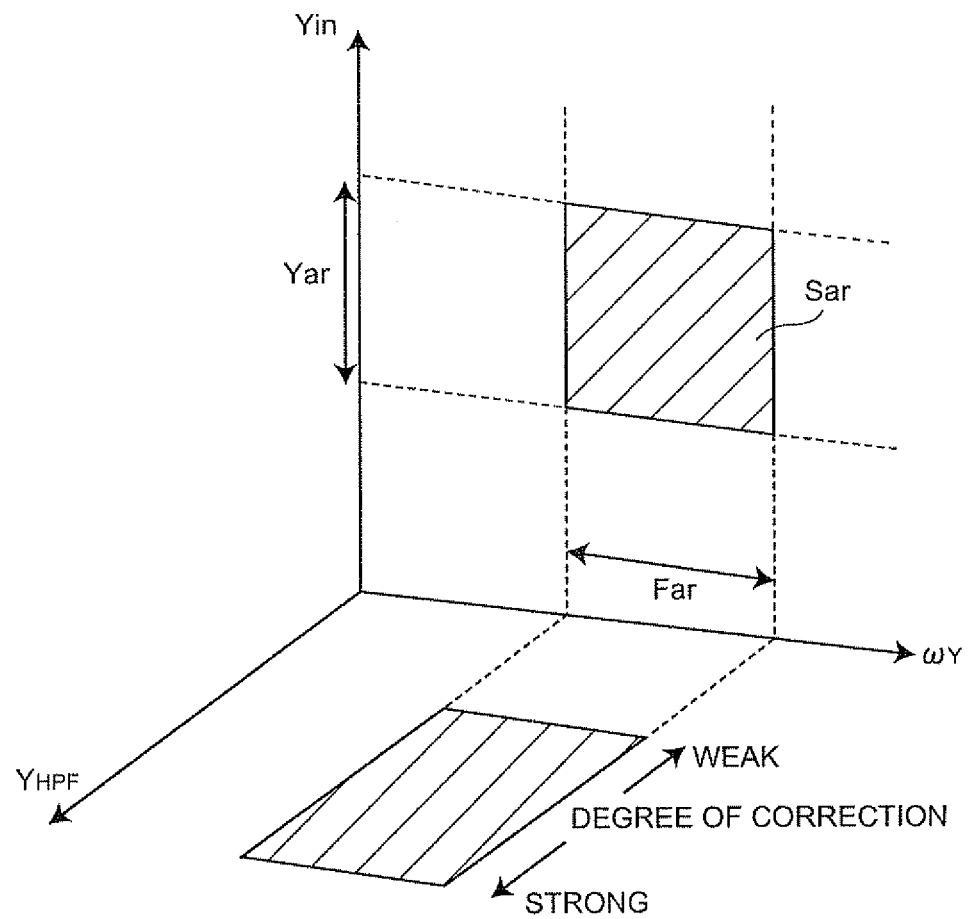
FIG. 3 is a view for explaining an operation of the image processing unit in FIG. 1.

FIG. 3 is a view for explaining an operation of the image processing unit 30 in FIG. 1. FIG. 3 schematically shows a luminance component of an input image signal, a spatial frequency of the luminance component, and a signal $Y_{HPF}$ with a high frequency component of the luminance component at the three-dimensional coordinate system.

The image processing unit 30 in FIG. 1 analyzes a spatial frequency of a luminance component of an image signal, calculates the amount of correction of the luminance component of the image signal according to the analysis result of the spatial frequency of the luminance component of the image signal only in a spatial frequency band Far (predetermined spatial frequency band), and corrects the luminance component of the image signal using the amount of correction. More specifically, the image processing unit 30 performs the gray level correction of a signal in a predetermined level range Yar (range Sar in FIG. 3) of the luminance signal Yin of the input image signal, which has been calculated by the luminance gain calculating unit G1, in the spatial frequency band Far of the luminance component of the image signal extracted by the signal extracting unit L1. In this case, the degree of gray level correction is made to change according to a high frequency component of a luminance component of an input image signal. For example, when there are many high frequency components in the luminance component, it is determined that there are many desired signal components and there are few luminance noises, the degree of correction is intensified. In addition, when there are few high frequency components in the luminance component, it is determined that there are few desired signal components and there are many luminance noises, the degree of correction is weakened. As a result, the luminance component can be changed only in the spatial frequency band Far extracted by the signal extracting unit L1 and the predetermined level range Yar of the luminance signal Yin which forms the input image signal calculated by the luminance gain calculating unit G1 without highlighting the luminance noise of the image and changing the tendency of the overall luminance.

Since the spatial frequency band extracted by the signal extracting unit L1, the level range of the luminance component where the gain coefficient g is calculated by the luminance gain calculating unit G1, the high frequency band of the luminance component, or the degree of correction can each be designated, the change in luminance of the input image signal can be increased according to the amount of luminance noises only in the designated level range of the luminance component of the designated spatial frequency band. Accordingly, for example, by increasing the luminance gain coefficient for a luminance component with low luminance, which is a dark portion, in the luminance gain calculating unit G1, the detail of the dark portion can be expressed without reducing the luminance range of other gray levels.

In addition, the whole screen is not uniformly corrected. Accordingly, even in the case where dark and bright portions are mixed, the detail of both the dark and bright portions can be expressed without uniformly increasing the luminance of the dark portion or uniformly decreasing the luminance of the bright portion. For example, in the case shown in FIG. 3, the correction is performed from the middle frequency band to the high frequency band of the luminance of the input image signal. Accordingly, only the detail can be highlighted without changing the overall luminance of the input image. Furthermore, since the detail of the dark portion of the image and the luminance noise can be distinguished from each other, it is possible to avoid the situation where the luminance noise is highlighted together with the detail of the dark portion.

Hereinafter, an example of the configuration of the projector 20 in the first embodiment for realizing such gray level correction will be described in detail. An example in which an image signal is formed by a luminance signal Y and color difference signals U and V will be described below. However, an image signal in the invention is not limited thereto.

Figure 4:
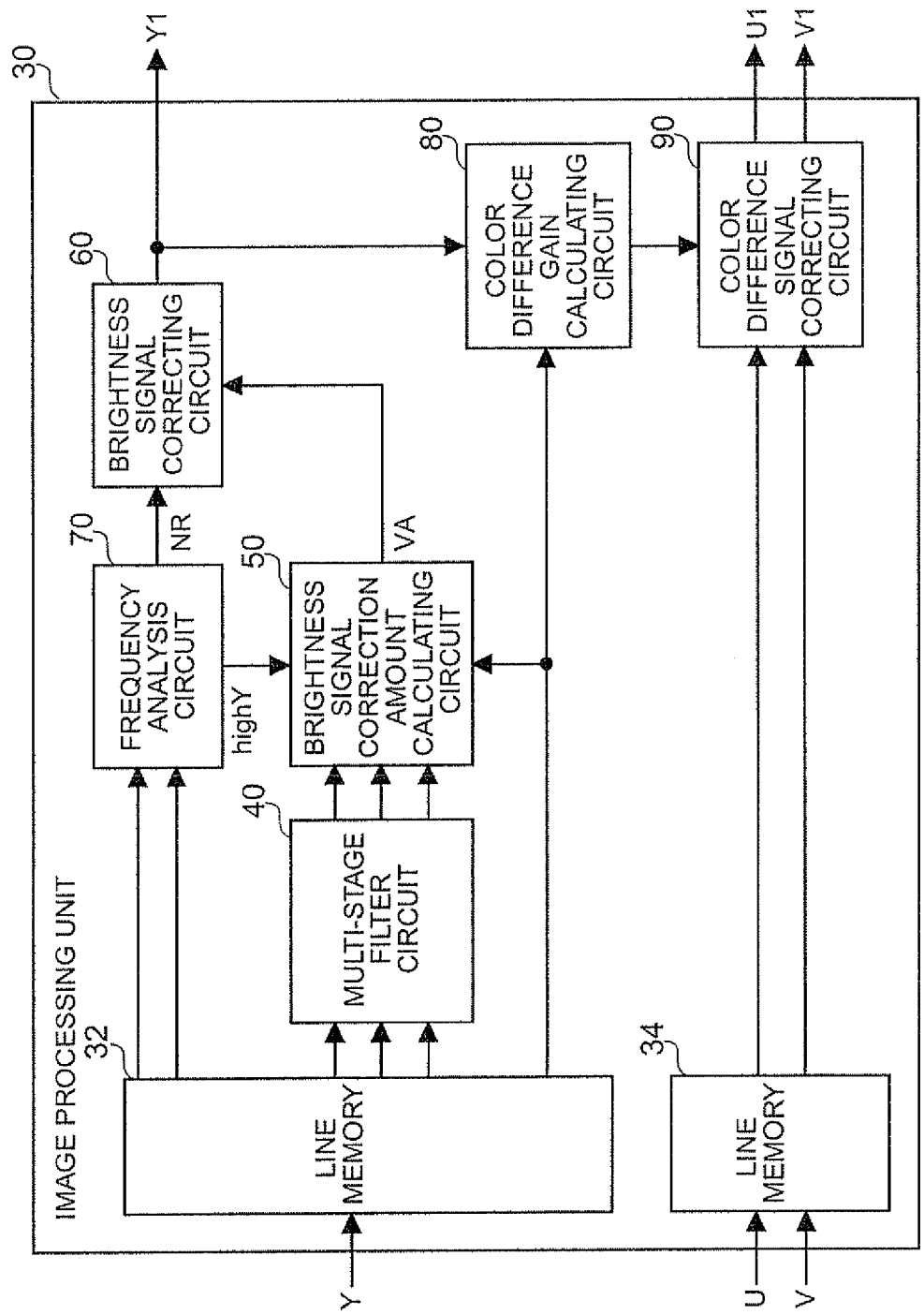
FIG. 4 is a block diagram illustrating an example of the hardware configuration of the image processing unit in FIG. 1.

FIG. 4 is a block diagram illustrating an example of the hardware configuration of the image processing unit 30 in FIG. 1.

The image processing unit 30 includes a line memory 32, a multi-stage filter circuit 40 as a signal extracting circuit, a luminance signal correction amount calculating circuit (luminance component correction amount calculating section) 50, a luminance signal correcting circuit (luminance component correcting section) 60, and a frequency analysis circuit (frequency analysis section) 70 which functions as a high frequency component extracting circuit or luminance noise removing circuit. In addition, the image processing unit 30 includes a line memory 34, a color difference gain calculating circuit (color difference component correction amount calculating section) 80, and a color difference signal correcting circuit (color difference component correcting section) 90.

The line memory 32 stores a luminance signal Y (luminance component of an input image signal) which forms an input image signal. The line memory 32 stores the luminance signal Y corresponding to the number of lines required in the multi-stage filter circuit 40.

The multi-stage filter circuit 40 extracts a signal in the predetermined spatial frequency band from the luminance signal Y (luminance component of the image signal) stored in the line memory 32. The multi-stage filter circuit 40 can realize a function of the signal extracting unit L1 in FIG. 2.

The frequency analysis circuit 70 analyzes the spatial frequency of the luminance signal stored in the line memory 32. More specifically, the frequency analysis circuit 70 can remove a luminance noise from the luminance signal from the line memory 32 while extracting the high frequency component of the luminance signal. The output highY, which is the absolute value of the high frequency component of the luminance signal extracted by the frequency analysis circuit 70, is supplied to the luminance signal correction amount calculating circuit 50 as the analysis result of the frequency analysis circuit 70. The luminance signal from which the luminance noise was removed by the frequency analysis circuit 70 is supplied to the luminance signal correcting circuit 60 as a luminance signal NR.

The luminance signal correction amount calculating circuit 50 calculates a correction signal VA corresponding to the amount of correction of the luminance signal on the basis of an output of the multi-stage filter circuit 40, the luminance signal stored in the line memory 32, and the analysis result of the frequency analysis circuit 70. According to the output highY, the luminance signal correction amount calculating circuit 50 can calculate the amount of correction for the luminance signal in a predetermined luminance level range of the luminance signals in the predetermined spatial frequency band extracted by the multi-stage filter circuit 40.

Here, the output highY is a signal corresponding to the luminance noise or detail of dark portions of the input image. That is, according to the level of the output highY, the luminance signal correction amount calculating circuit 50 can generate the amount of correction such that the degree of correction becomes intensified when it is determined that the amount of luminance noises is small and the degree of correction becomes weakened when it is determined that the amount of luminance noises is large. The luminance signal correction amount calculating circuit 50 can realize a function of the luminance gain calculating unit G1 in FIG. 2 or a frequency gain calculating unit (not shown).

The luminance signal correcting circuit 60 corrects the luminance signal NR, from which the luminance noise was removed by the frequency analysis circuit 70, by using the correction signal VA calculated by the luminance signal correction amount calculating circuit 50 and outputs it as a corrected luminance signal Y1.

In addition, the image processing unit 30 is configured to be able to correct a color difference signal simultaneously with the correction of the luminance signal. Accordingly, the color difference signals U and V (color difference components of the input image signal), which correspond to the luminance signal, are stored in the line memory 34 in synchronization with the timing at which the luminance signal Y is stored in the line memory 32.

The color difference gain calculating circuit 80 calculates the amount of correction of the color difference signals U and V on the basis of the luminance signals Y and Y1 before and after correction using the luminance signal correcting circuit 60, for example, such that the value of the xy chromaticity of the XYZ colorimetric system (CIE 1931 standard colorimetric system) does not change. Here, the color difference gain calculating circuit 80 calculates the gain coefficient corresponding to the amount of correction of the color difference signal.

The color difference signal correcting circuit 90 corrects the color difference signals U and V stored in the line memory 34 using the amount of correction calculated by the color difference gain calculating circuit 80 and outputs them as corrected color difference signals U1 and V1. As a result, the color difference signal correcting circuit 90 can correct the color difference signals U and V such that the value of the xy chromaticity does not change before and after correction using the luminance signal correcting circuit 60.

Thus, the image processing unit 30 can correct the luminance signal according to the analysis result of the spatial frequency of the luminance signal of the input image only for luminance signals with a predetermined luminance level in a predetermined spatial frequency band. In addition, the image processing unit 30 can correct a color difference signal according to the amount of correction of the luminance signal simultaneously with the correction of the luminance signal.

Next, each block which forms the image processing unit 30 will be described.

Figure 5:
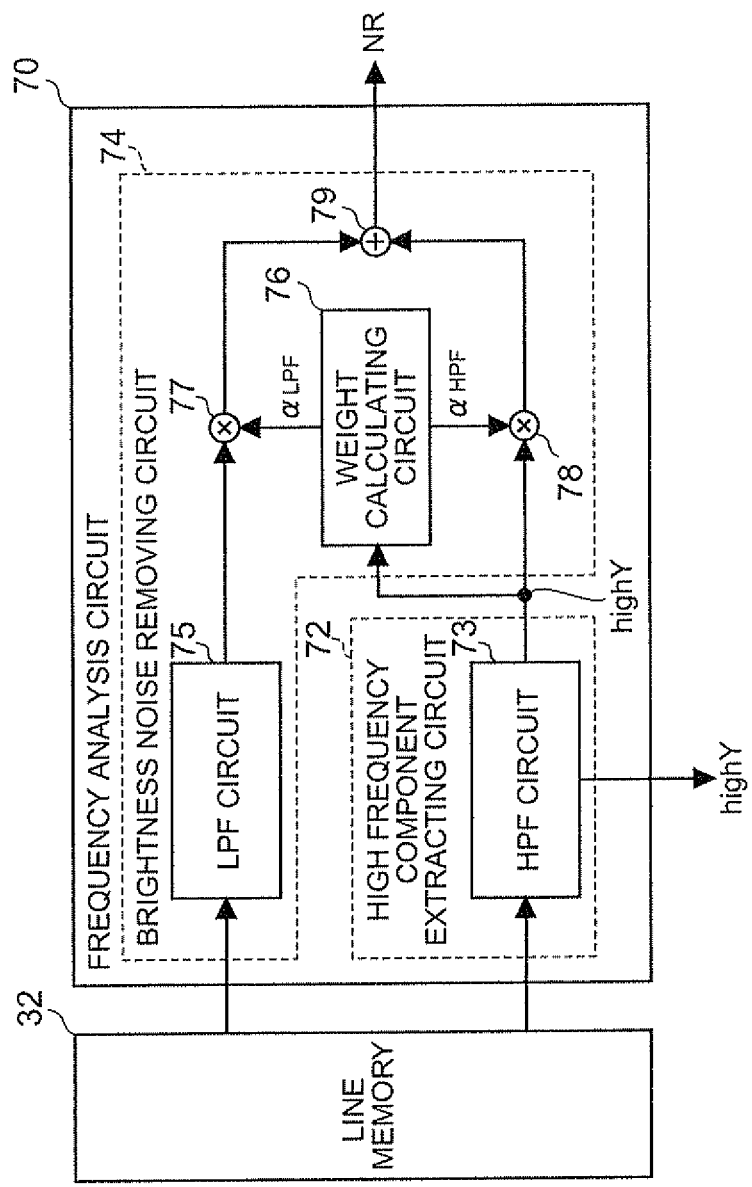
FIG. 5 is a block diagram illustrating an example of the configuration of a frequency analysis circuit in FIG. 4.

FIG. 5 is a block diagram illustrating an example of the configuration of the frequency analysis circuit 70 in FIG. 4. In FIG. 5, the same sections as in FIG. 4 are denoted by the same reference numerals, and the explanation will be appropriately omitted.

The frequency analysis circuit 70 includes a high frequency component extracting circuit (high frequency component extracting section) 72 and a luminance noise removing circuit (luminance noise removing section) 74. The high frequency component extracting circuit 72 extracts a predetermined high frequency component, in which the detail of a dark portion of an image and a luminance noise are included, from the luminance signal accumulated in the line memory 32 and outputs the absolute value as the output highY. The luminance noise removing circuit 74 generates the luminance signal NR, from which the luminance noise has been removed, from the luminance signal accumulated in the line memory 32. Here, the luminance noise removing circuit 74 generates the luminance signal NR using the high frequency component extracted by the high frequency component extracting circuit 72.

The high frequency component extracting circuit includes an HPF (high pass filter) circuit 73. A luminance signal from the line memory 32 is input to the HPF circuit 73, and the HPF circuit 73 outputs the absolute value of the high frequency component of the luminance signal as the output highY to the luminance signal correction amount calculating circuit 50 or the luminance noise removing circuit 74. The HPF circuit 73 outputs the output highY as the absolute value of the high frequency component by the known HPF processing according to the following expression.

$$highY = \sum_{(u,v) \in F} a_{HPF}(u, v) Y(x+u, y+v) \left( -\frac{s-1}{2} \leq u, v \leq \frac{s-1}{2} \right) \quad (1)$$

Here, highY is the output of the HPF circuit 73, Y is an input luminance signal, (x, y) are the coordinates of an object pixel, $a_{HPF}$ is a filter coefficient, (u, v) are within the above range in the relative coordinate system having the object pixel as the center, and s is the filter size. S may be set to '3', for example. However, s may be set to a different number other than '3'.

The luminance noise removing circuit 74 includes an LPF (low pass filter) circuit 75, a weight calculating circuit 76, multipliers 77 and 78, and an adder 79. A luminance signal from the line memory 32 is input to the LPF circuit 75, and a low frequency component of the luminance signal passes through the LPF circuit 75. Such an LPF circuit 75 outputs the output lowY by the known LPF processing according to the following expression.

$$lowY = \sum_{(u,v) \in F} a_{LPF}(u, v) Y(x+u, y+v) \left( -\frac{s-1}{2} \leq u, v \leq \frac{s-1}{2} \right) \quad (2)$$

Here, lowY is the output of the LPF circuit 75, Y is an input luminance signal, (x, y) are the coordinates of an object pixel, $a_{LPF}$ is a filter coefficient, (u, v) are within the above range in the relative coordinate system having the object pixel as the center, and s is the filter size. S may be set to '5', for example. However, s may be set to a different number other than '5' and is preferably larger than the filter size of the HPF circuit 73.

Figure 6:
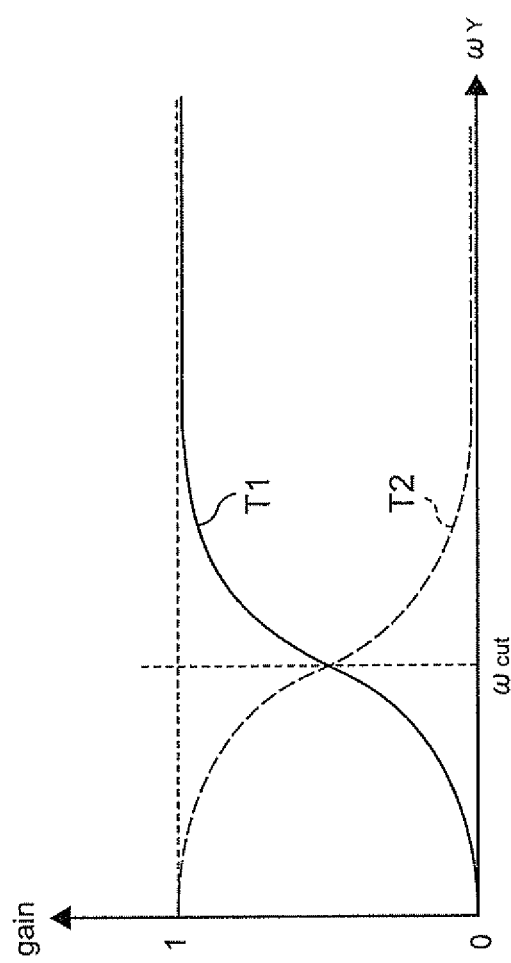
FIG. 6 is a view illustrating an example of the filter characteristics of an HPF circuit and an LPF circuit in FIG. 5.

FIG. 6 is a view illustrating an example of the characteristics of the HPF circuit 73 and the LPF circuit in the FIG. 5. In FIG. 6, the horizontal axis indicates a frequency of a luminance signal and the horizontal axis indicates the gain.

The output of the HPF circuit 73 is decreased in a region where the spatial frequency of the luminance signal is low and is increased in a region where the spatial frequency of the luminance signal is high (T1 in FIG. 6). The cut-off frequency of the HPF circuit 73 is $\omega_{HPF}$. On the other hand, the output of the LPF circuit 75 is increased in a region where the spatial frequency of the luminance signal is low and is decreased in a region where the spatial frequency of the luminance signal is high (T2 in FIG. 6). The cut-off frequency of the LPF circuit 75 is $\omega_{LPF}$. Here, it is preferable that the cut-off frequency of the HPF circuit 73 and the cut-off frequency of the LPF circuit 75 be equal ($\omega_{HPF} = \omega_{LPF} = \omega_{cut}$). Thereby, the luminance signal can be corrected without omitting the information of the original luminance signal.

In FIG. 5, the weight calculating circuit 76 calculates the amount of weighting according to the output from the high frequency component extracting circuit 72. The weight calculating circuit 76 stores the amount of weighting corresponding to the output highY of the HPF circuit 73 in the form of a look-up table (hereinafter, referred to as a LUT), such that the value corresponding to the output from the HPF circuit 73 can be read or a plurality of values corresponding to the output from the HPF circuit 73 can be interpolated and output.

FIG. 7 is a view for explaining an operation of the weight calculating circuit 76.

According to the output of the HPF circuit 73, the weight calculating circuit 76 outputs a weight coefficient $\alpha_{LPF}$ to the multiplier 77 and outputs a weight coefficient $\alpha_{HPF}$ to the multiplier 78. More specifically, the weight calculating circuit 76 stores the weight coefficients $\alpha_{HPF}$ and $\alpha_{LPF}$ corresponding to the output from the HPF circuit 73 in the LUT format beforehand. That is, weight coefficients ($\alpha_{HPF}$a, $\alpha_{LPF}$a) ($\alpha_{HPF}$b, $\alpha_{LPF}$b), ($\alpha_{HPF}$C, $\alpha_{LPF}$C), . . . which correspond to the output of the HPF circuit 73 are stored beforehand in the weight calculating circuit 76, such that the weight coefficients $\alpha_{HPF}$ and $\alpha_{LPF}$ corresponding to the output highY are output when the output highY of the HPF circuit 73 is input.

Figure 8:
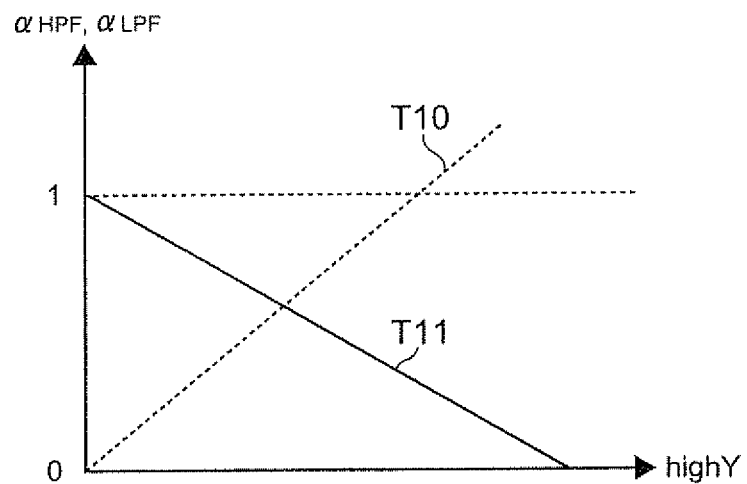
FIG. 8 is a view for explaining the weight coefficient that the weight calculating circuit outputs.

FIG. 8 is a view for explaining the weight coefficients $\alpha_{HPF}$ and $\alpha_{LPF}$ output from the weight calculating circuit 76. In FIG. 8, the horizontal axis indicates the output of the HPF circuit 73, and the vertical axis indicates the weight coefficients $\alpha_{HPF}$ and $\alpha_{LPF}$ as the amount of weighting output from the weight calculating circuit 76.

In the weight calculating circuit 76, the weight coefficient $\alpha_{HPF}$ whose value increases as the output highY of the HPF circuit 73 increases is stored (T10 in FIG. 8), and the weight coefficient $\alpha_{LPF}$ whose value decreases as the output highY of the HPF circuit 73 increases is stored (T11 in FIG. 8). In addition, in FIG. 8, although the weight coefficients $\alpha_{HPF}$ and $\alpha_{LPF}$ increase or decrease linearly according to the output highY of the HPF circuit 73, the weight coefficients $\alpha_{HPF}$ and $\alpha_{LPF}$ may increase or decrease according to a predetermined function.

In FIG. 5, the multiplier 77 outputs to the adder 79 a result of multiplication of the output of the LPF circuit 75 and the weight coefficient $\alpha_{LPF}$ from the weight calculating circuit 76. The multiplier 78 outputs to the adder 79 a result of multiplication of the output of the HPF circuit 73 and the weight coefficient $\alpha_{HPF}$ from the weight calculating circuit 76. The adder 79 adds the multiplication result of the multiplier 77 and the multiplication result of the multiplier 78 and outputs it as the luminance signal NR after removing a luminance noise. That is, the luminance noise removing circuit 74 outputs the luminance signal NR according to the following expression.

$$NR = \alpha_{HPF} \cdot highY + \alpha_{LPF} \cdot lowY \qquad (3)$$

In the above expression, highY is the output of the HPF circuit 73 and lowY is the output of the LPF circuit 75.

Since the weight calculating circuit 76 outputs the weight coefficients $\alpha_{HPF}$ and $\alpha_{LPF}$ as shown in FIG. 8, the luminance signal NR becomes a signal from which a high-frequency luminance noise is removed. That is, since a region where the output highY of the HPF circuit is small mainly corresponds to a luminance signal distributed over a low frequency band, the desired luminance signal NR can be acquired without highlighting the luminance noise by decreasing the weight coefficient $\alpha_{HPF}$ and increasing the weight coefficient $\alpha_{LPF}$. On the other hand, since a region where the output highY of the HPF circuit 73 is large mainly corresponds to a luminance signal distributed over a high frequency band, the desired luminance signal NR can be acquired by increasing the weight coefficient $\alpha_{HPF}$ and decreasing the weight coefficient $\alpha_{LPF}$ to maintain or highlight the edge information.

In addition, it was described that the frequency analysis circuit 70 was configured to include the high frequency component extracting circuit 72 and the luminance noise removing circuit 74 in FIG. 5. However, the frequency analysis circuit 70 may be configured to include only the high frequency component extracting circuit 72 so that a luminance signal accumulated in the line memory 32 is supplied to the luminance signal correcting circuit 60 as the luminance signal NR as it is.

Figure 9:
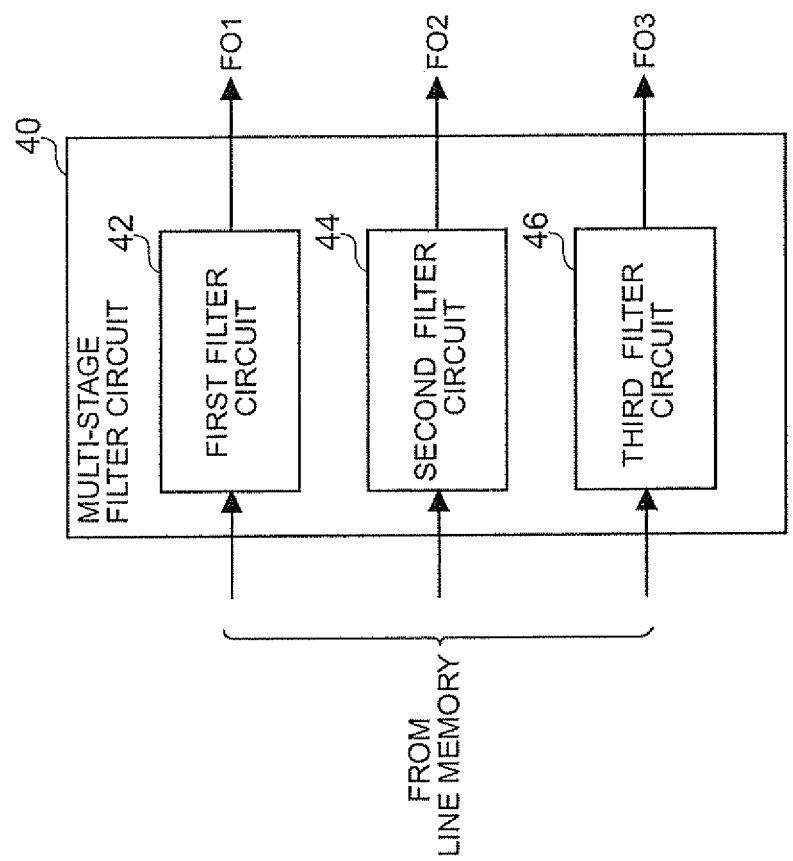
FIG. 9 is a block diagram illustrating an example of the configuration of a multi-stage filter circuit in FIG. 4.

FIG. 9 is a block diagram illustrating an example of the configuration of the multi-stage filter circuit 40 in FIG. 4. In FIG. 9, the same sections as in FIG. 4 are denoted by the same reference numerals, and the explanation will be appropriately omitted.

The multi-stage filter circuit 40 includes first to third filter circuits 42, 44, and 46 with different filter sizes. In FIG. 9, an example in which the multi-stage filter circuit 40 performs filtering with three kinds of filter circuits will be described. However, the invention is not limited to the number of filter circuits.

The multi-stage filter circuit 40 has a plurality of filter circuits, and the frequency bands of signals extracted by the plurality of filter circuits are different. Each of the filter circuits outputs the result of a convolution operation of pixel values of the pixels which are arrayed in the horizontal and vertical directions of an image and the filter coefficient matrix.

The first filter circuit 42 can output the result after filtering is performed according to the following expression.

$$FO1 = \sum_{(i,j) \in F} a(i,j) Y(x+i, y+j) \left( -\frac{s-1}{2} \le i, j \le \frac{s-1}{2} \right) \qquad (4)$$

In the above expression, it is assumed that the output of the first filter circuit 42 is F01, the luminance signal of the coordinates (x, y) is Y(x, y), the filter coefficient is a, (i, j) are the relative coordinates with respect to the object pixel and are within the range of the above expression, and the filter size is s. Luminance signals of the line number (vertical scan line number) corresponding to the filter size are input to each filter circuit.

Although the output of the first filter circuit 42 is shown in the above expression, the second and third filter circuits 44 and 46 can also output the same filtering result as in the above expression (outputs FO2 and FO3).

In FIG. 9, the filter size of the first filter circuit 42 is set to '3', the filter size of the second filter circuit 44 is set to '5', and the filter size of the third filter circuit 46 is set to '7'. However, the invention is not limited to the filter size.

Figure 10:
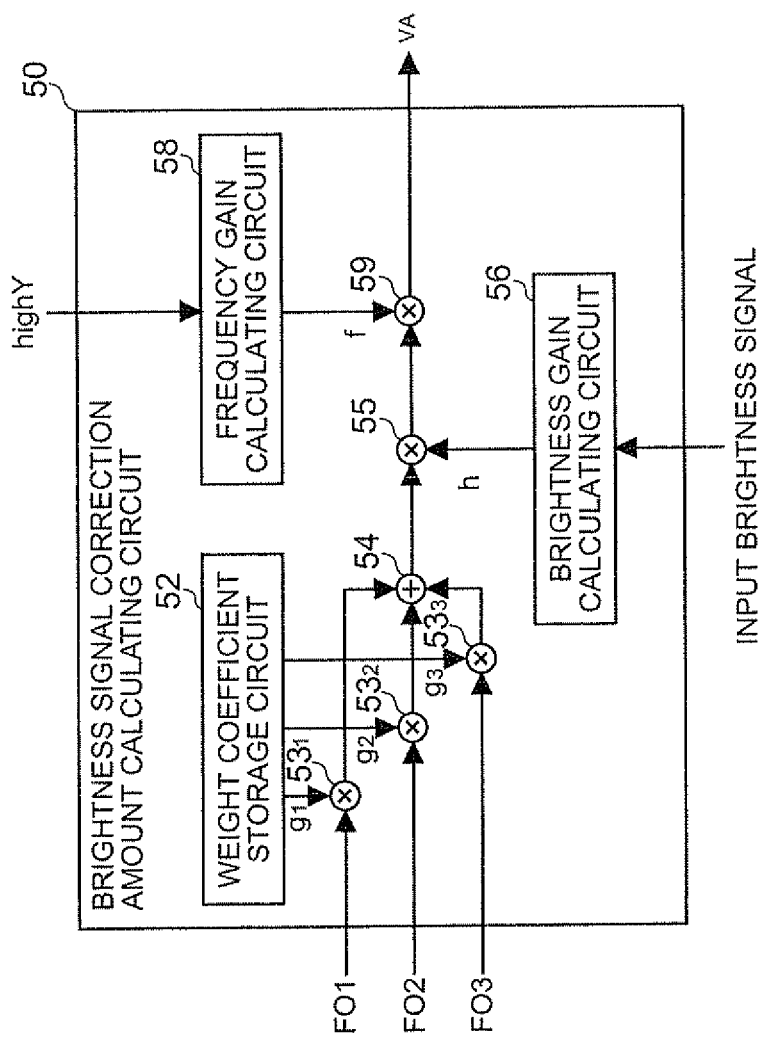
FIG. 10 is a block diagram illustrating an example of the configuration of a luminance signal correction amount calculating circuit in FIG. 4.

FIG. 10 is a block diagram illustrating an example of the configuration of the luminance signal correction amount calculating circuit 50 in FIG. 4. In FIG. 10, the same sections as in FIG. 4 are denoted by the same reference numerals, and the explanation will be appropriately omitted.

Figure 11:
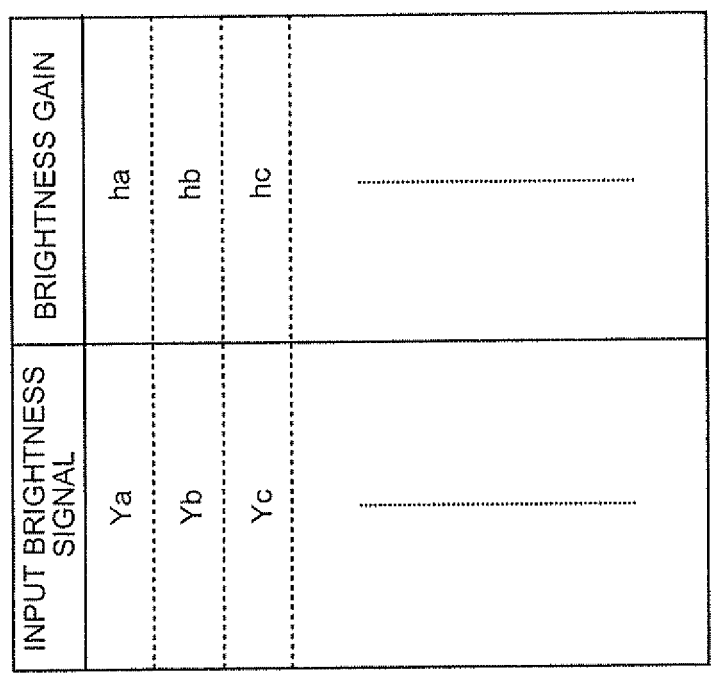
FIG. 11 is a view for explaining an operation of a luminance gain calculating circuit in FIG. 10.

FIG. 11 is a view for explaining an operation of the luminance gain calculating circuit in FIG. 10.

FIG. 12 is a view for explaining an operation of the frequency gain calculating circuit in FIG. 10.

The luminance signal correction amount calculating circuit 50 includes a weight coefficient storage circuit 52, multipliers $53_1$ to $53_3$, an adder 54, a multiplier 55, a luminance gain calculating circuit (luminance gain calculating section) 56, a frequency gain calculating circuit (frequency gain calculating section) 58, and a multiplier 59.

The weight coefficient storage circuit 52 stores weight coefficients $g_1$ to $g_3$ which are constant values decided beforehand. The weight coefficient $g_1$ is input to the multiplier $53_1$ to which the output FO1 of the first filter circuit 42 is input. The multiplier $53_1$ outputs a result, which is obtained by multiplying the output FO1 of the first filter circuit 42 by the weight coefficient $g_1$, to the adder 54.

The weight coefficient $g_2$ is input to the multiplier $53_2$ to which the output FO2 of the second filter circuit 44 is input. The multiplier $53_2$ outputs a result, which is obtained by multiplying the output FO2 of the second filter circuit 44 by the weight coefficient $g_2$, to the adder 54.

The weight coefficient $g_3$ is input to the multiplier $53_3$ to which the output F03 of the third filter circuit 46 is input. The multiplier $53_3$ outputs a result, which is obtained by multiplying the output FO3 of the third filter circuit 46 by the weight coefficient $g_3$, to the adder 54.

The adder 54 adds the multiplication results of the multipliers $53_1$ to $53_3$ and outputs the addition result to the multiplier 55. The luminance gain coefficient h calculated by the luminance gain calculating circuit 56 is input to the multiplier 55.

A luminance signal which forms the input image signal is input to the luminance gain calculating circuit 56. In addition, the luminance gain calculating circuit 56 calculates the luminance gain coefficient h (luminance gain) corresponding to the level (level of the luminance component of the image signal) of the luminance signal, as shown in FIG. 11.

Such a luminance gain calculating circuit 56 is realized by the LUT which has a luminance signal (luminance component of an image signal) as the inputs and has the luminance gain coefficient h as the outputs. For this reason, luminance gain coefficients ha, hb, hc, . . . which correspond to the luminance signals (input luminance signals) which form the input image signal, are stored beforehand in the luminance gain calculating circuit 56, such that the luminance gain coefficient corresponding to the luminance signal is output when the luminance signal which form the input image signal is input. Since the luminance gain coefficient corresponding to a desired luminance signal can be designated in the luminance gain calculating circuit 56, the amount of correction can be generated only for the designated gray level.

The multiplier 55 multiplies the addition result of the adder 54 by the luminance gain coefficient h from the luminance gain calculating circuit 56 and outputs the multiplication result to the multiplier 59. The frequency gain coefficient f calculated by the frequency gain calculating circuit 58 is input to the multiplier 59.

The output highY from the HPF circuit 73 in FIG. 5 is input to the frequency gain calculating circuit 58. Then, the frequency gain calculating circuit 58 calculates the frequency gain coefficient f (frequency gain) corresponding to the level of the output highY of the HPF circuit 73, as shown in FIG. 12.

Such a frequency gain calculating circuit 58 is realized by the LUT which has the output highY of the HPF circuit 73 as the input and has the frequency gain coefficient f as the output. For this reason, frequency gain coefficients fa, fb, fc, . . . which correspond to the output highY are stored beforehand in the frequency gain calculating circuit 58, such that the frequency gain coefficient corresponding to the output highY is output when the output highY from the HPF circuit 73 is input. Since the frequency gain coefficient corresponding to the desired output highY can be designated in the frequency gain calculating circuit 58, the amount of correction can be generated only for the designated high frequency band.

The multiplier 59 outputs the correction signal VA corresponding to the amount of correction of the luminance signal by multiplying the multiplication result of the multiplier 55 by the frequency gain coefficient f from the frequency gain calculating circuit 58. The correction signal VA is input to the luminance signal correcting circuit 60.

Thus, the luminance signal correction amount calculating circuit 50 can calculate the amount of correction of the luminance signal on the basis of the signal in the predetermined spatial frequency band extracted by the multi-stage filter circuit 40 (in a broad sense, a signal extracting circuit), the luminance gain coefficient calculated by the luminance gain calculating circuit 56, and the frequency gain coefficient calculated by the frequency gain calculating circuit 58. In addition, the luminance signal correcting circuit 60 outputs the corrected luminance signal Y1 by adding the correction signal VA from the luminance signal correction amount calculating circuit 50 to the luminance signal which forms the input image signal or the luminance signal from which the luminance noise component has been removed, for example. Accordingly, since the correction can be performed only when there is a small amount of luminance noise, it is possible to prevent the luminance noise from being amplified by the correction.

In addition, the correction processing of a color difference signal which corresponds to the amount of correction of the luminance signal and which is performed simultaneously with the correction of the luminance signal can be realized by the following configuration.

Figure 13:
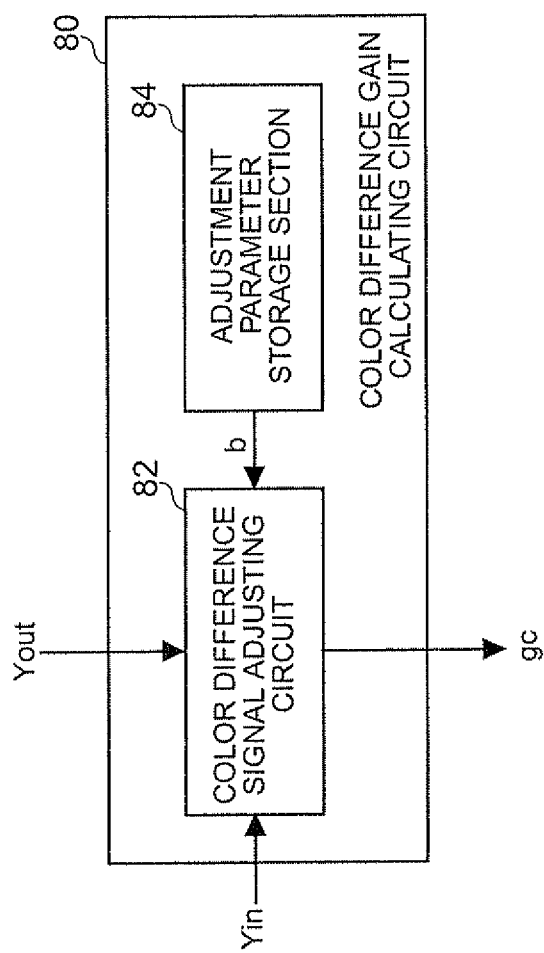
FIG. 13 is a block diagram illustrating an example of the configuration of a color difference gain calculating circuit in FIG. 4.

FIG. 13 is a block diagram illustrating an example of the configuration of the color difference gain calculating circuit 80 in FIG. 4. In FIG. 13, the same sections as in FIG. 4 are denoted by the same reference numerals, and the explanation will be appropriately omitted.

The color difference gain calculating circuit 80 includes a color difference signal adjusting circuit 82 and an adjustment parameter storage section 84. The luminance signal (luminance component of the input image signal) Yin which forms the input image signal, the luminance signal Yout obtained by correcting the luminance signal Yin as described above, and an adjustment parameter b stored in the adjustment parameter storage section 84 are input to the color difference signal adjusting circuit 82. Moreover, the color difference signal adjusting circuit 82 calculates a color difference gain coefficient (color difference gain) gc using the luminance signals Yin and Yout and the adjustment parameter b.

More specifically, the color difference gain calculating circuit 80 calculates the color difference gain coefficient gc according to the following expression.

$$gc = 1 - b \times (1 - Yout/Yin) \tag{5}$$

In the above expression, the adjustment parameter b is a parameter for adjusting the chromaticity. When the adjustment parameter b is '0', the color difference signal (color difference component) which forms the input image signal is output without being corrected. On the other hand, when the adjustment parameter b is '1', the color difference signal is also corrected according to the amount of correction of the luminance signal so that the chromaticity is not changed before and after the correction of the luminance signal of the input image signal. Although the adjustment parameter b can be set to a value which is larger than '0' and smaller than '1', the adjustment parameter b is preferably '1' in the first embodiment.

Figure 14:
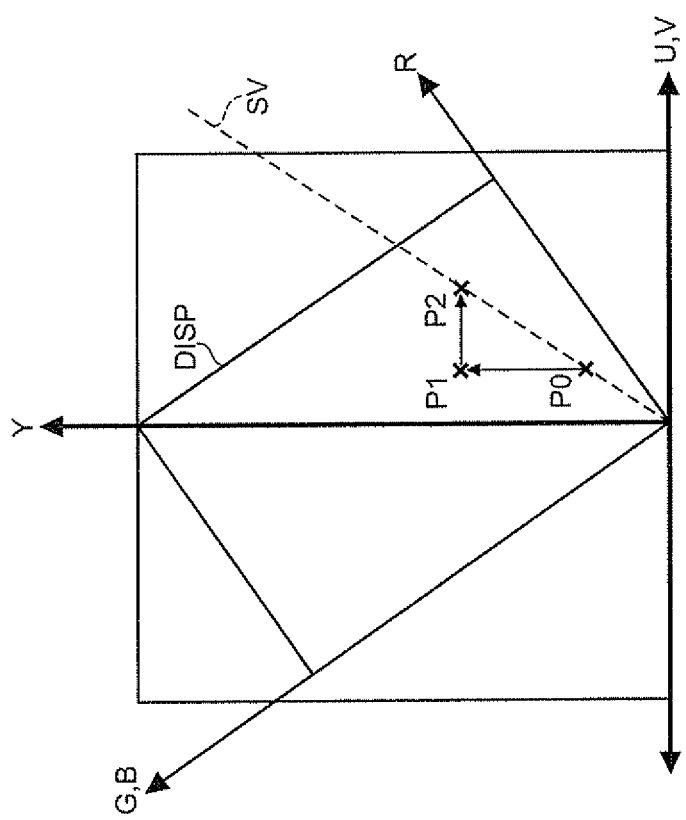
FIG. 14 is a view for explaining an operation of the color difference gain calculating circuit in FIG. 13.

FIG. 14 is a view for explaining an example of the operation of the color difference gain calculating circuit 80 in FIG. 13. In FIG. 14, the adjustment parameter b is assumed to be '1'.

When the color space, in which the luminance signal is shown on the vertical axis and the color difference signal is shown on the horizontal axis, is expressed, R, and G, and B components of the RGB are defined in the directions shown in FIG. 14. Here, a region DISP indicates the color gamut which can be reproduced in the display device. In this case, when the color of the input image signal is at the coordinate P0, the value of the xy chromaticity diagram is equal on the isopleth SV passing through the coordinate P0.

However, when the luminance signal which forms the input image signal is corrected as described above, it moves to the coordinate P1. For this reason, the tendency of the color after the correcting of the luminance signal changes since the coordinate P1 does not exist on the isopleth SV.

Therefore, the color difference gain calculating circuit 80 calculates the color difference gain coefficient gc in order to correct the color difference signal according to the amount of correction of the luminance signal so that the color of the input image signal at the coordinate P0 is converted to the coordinate P2 on the isopleth SV. This makes it possible to maintain the tendency of the colors on the whole screen without changing the luminance level after correction even if the luminance signal is corrected. As a result, visually natural correction can be realized without changing the chromaticity of each pixel before and after correction.

The color difference gain coefficient gc calculated in this way is input to the color difference signal correcting circuit 90. The color difference signal correcting circuit 90 multiplies the color difference gain coefficient gc by the color difference signal V from the line memory 34 while multiplying the color difference gain coefficient gc by the color difference signal U from the line memory 34. The color difference signals U and V corrected in this way are input to the projection unit 100.

Thus, the image processing unit 30 can correct not only the luminance signal but also the color difference signal simultaneously with the luminance signal. As a result, since it is possible to avoid the situation where the chromaticity of each pixel changes according to the amount of correction of the luminance signal and the tendency of the overall colors on the screen accordingly changes, the tendency of the colors on the whole screen can be maintained when expressing the detail of the image.

The processing of the image processing unit 30 in the first embodiment may also be realized by software processing. In this case, the image processing unit 30 includes a central processing unit (hereinafter, simply referred to as a CPU) and a read only memory (hereinafter, simply referred to as a ROM) or a random access memory (hereinafter, simply referred to as a RAM). The image processing unit 30 performs the correction processing of the luminance component and the color difference component by controlling the hardware, such as the multiplier and the adder, by making the CPU, which has read a program stored in the ROM or RAM, execute the processing corresponding to the program.

Figure 15:
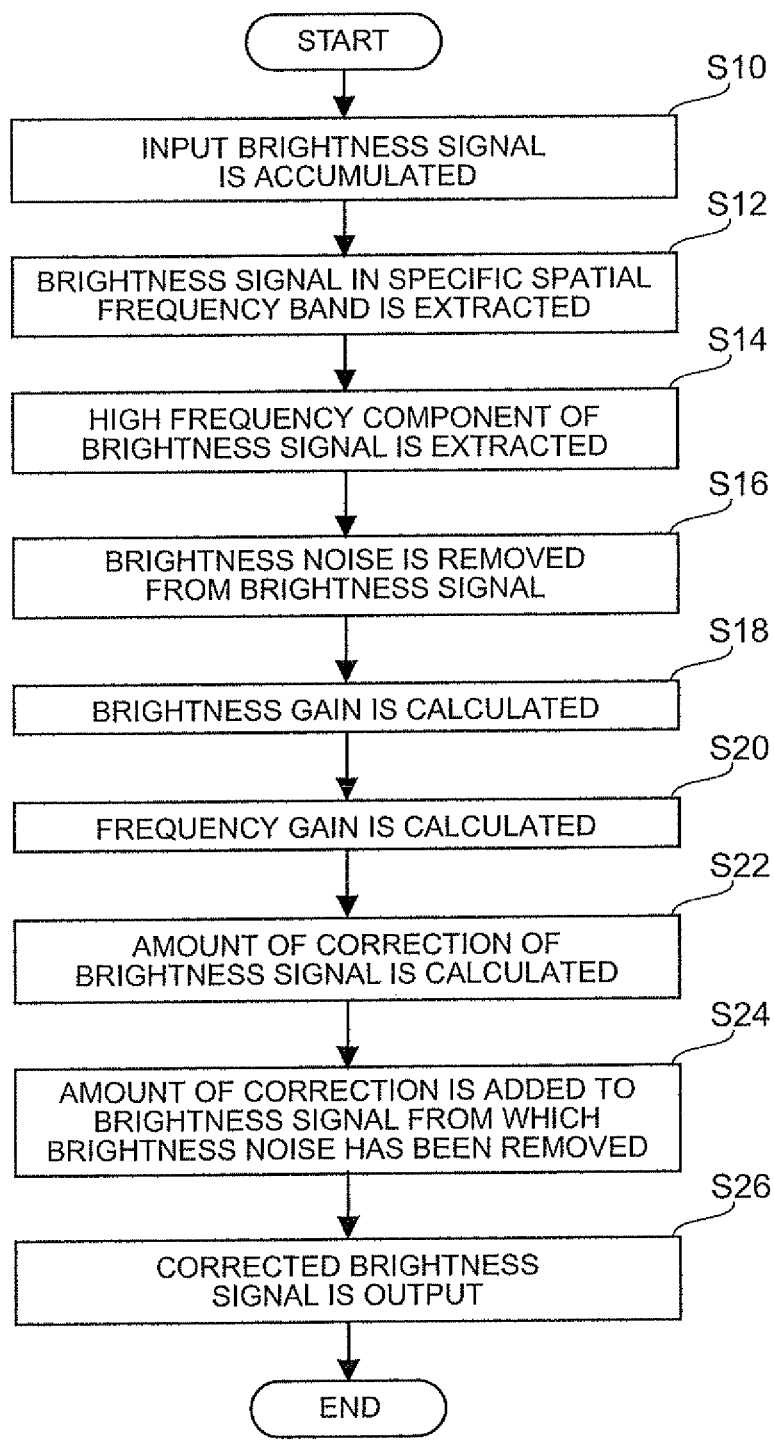
FIG. 15 is a flow chart illustrating an example of the correction process of a luminance signal of the image processing unit in the first embodiment.

FIG. 15 is a flow chart illustrating an example of correction processing of a luminance signal of the image processing unit 30 in the first embodiment. In the case of realizing the processing in FIG. 15 with software, a program for realizing the processing shown in FIG. 15 is stored in the ROM or RAM provided in the image processing unit 30.

First, as an input luminance signal accumulating step (step S10), the image processing unit 30 accumulates a luminance signal (input luminance signal) which forms an input image signal. In this case, the luminance signal is stored in the line memory 32 or the RAM used for realizing the function of the line memory 32.

Then, as a signal extracting step (step S12), the image processing unit 30 extracts a luminance signal in a specific spatial frequency band from the luminance signal accumulated in the line memory 32 and the like. For example, the multi-stage filter circuit 40 extracts the luminance signal in the predetermined spatial frequency band. Or when realizing the above by software processing, the CPU controls the multiplier or the adder used for realizing the function of the multi-stage filter circuit 40 to thereby extract the luminance signal in the spatial frequency band.

Then, as a frequency analysis step (steps S14 and S16), the image processing unit 30 analyzes the spatial frequency of the luminance signal in the specific spatial frequency band extracted in step S12. More specifically, in step S14, a luminance signal with a predetermined high frequency component in the specific spatial frequency band extracted in step S12 is extracted as a high frequency component extracting step (step S14). Then, in step S16, a luminance noise component is removed from the luminance signals accumulated in the line memory 32 and the like as a luminance noise removing step (step S16).

Then, as a luminance component correction amount calculating step (steps S18, S20, and S22), the image processing unit 30 calculates the amount of correction of the luminance signal. More specifically, in step S18, the luminance signal extracted in step S12 is weighted and is multiplied by the coefficient corresponding to the luminance level of the luminance signal which forms the input image signal as a luminance gain calculating step (step S18). Then, in step S20, the luminance signal calculated in step S18 is multiplied by the coefficient corresponding to the luminance signal (output highY of the HPF circuit 73) with the high frequency component extracted in step S14, as a frequency gain calculating step (step S20). As a result, in step S22, the correction signal VA corresponding to the amount of correction of the luminance signal is generated (step S22). Or when realizing the above by software processing, the CPU performs weighting for the luminance signal extracted by the signal extracting processing and then generates the multiplication result, which is obtained by using the coefficient corresponding to the luminance level of the luminance signal which forms the input image signal and the coefficient corresponding to the luminance signal (output highY of the HPF circuit 73) with the high frequency component extracted in step S14, as the correction signal VA corresponding to the amount of correction of the luminance signal. Thus, in step S20, the amount of correction of the luminance component is calculated on the basis of the signal in the spatial frequency band extracted in step S12, the luminance gain calculated in step S18, and the frequency gain calculated in step S22.

Then, as a luminance component correcting step (step S24), the image processing unit 30 corrects the luminance signal, from which the luminance noise was removed in step S16, using the amount of correction calculated in step S22 and outputs the corrected luminance signal (step S26), completing the series of the process (End). That is, in step S24, the luminance signal correcting circuit 60 generates the corrected luminance signal by adding the correction signal VA to the luminance signal from which the luminance noise was removed in step S16. Or when realizing the above by software processing, the CPU generates the corrected luminance signal by adding the correction signal VA to the luminance signal from which the luminance noise was removed in step S16.

Moreover, in the first embodiment, the order of steps S14 and S16 in FIG. 15 may be exchanged or the order of steps S18 and S20 in FIG. 15 may be exchanged, and the order is not limited to the processing order shown in FIG. 15.

Figure 16:
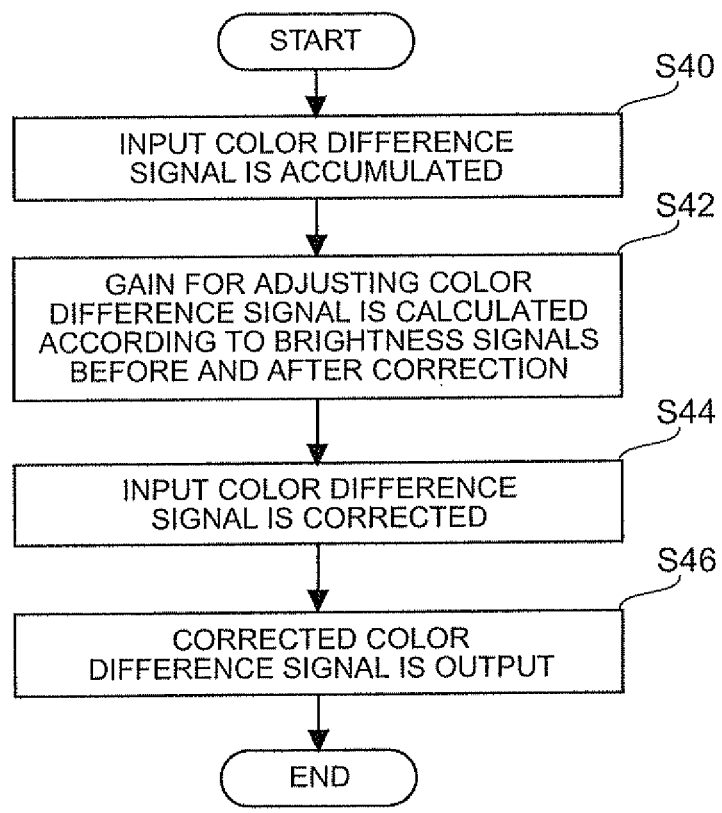
FIG. 16 is a flow chart illustrating an example of the correction process of a color difference signal of the image processing unit in the first embodiment.

FIG. 16 is a flow chart illustrating an example of correction processing of a color difference signal of the image processing unit 30 in the first embodiment. In the case of realizing the processing in FIG. 16 with software, a program for realizing the processing shown in FIG. 16 is stored in the ROM or RAM provided in the image processing unit 30.

First, as an input color difference signal accumulating step (step S40), the image processing unit 30 accumulate a color difference signal (input color difference signal) which forms an input image signal. In this case, the color difference signal is stored in the line memory 32 or the RAM used for realizing the function of the line memory 32.

Then, as a color difference component correction amount calculating step (step S42), the image processing unit 30 calculates the color difference gain coefficient for adjusting the color difference signal according to the luminance signals before and after correction in the correction processing of the luminance signal in FIG. 15. For example, the color difference signal adjusting circuit 82 outputs the color difference gain coefficient gc corresponding to the adjustment parameter designated beforehand and the luminance signals before and after the correction. Or when realizing the above by software processing, the CPU outputs the color difference gain coefficient gc according to the above expression (5) using the adjustment parameter b determined beforehand. Thus, in step S42, the amount of correction of the color difference component of the image signal is calculated such that the value of the xy chromaticity does not change before and after correction in the luminance component correcting step.

Then, as a color difference component correcting step (step S44), the image processing unit 30 corrects the color difference signal, which forms the input image signal, using the amount of correction (color difference gain coefficient) of the color difference component calculated in step S42 and outputs the corrected color difference signal (step S46), completing the series of the process (End). That is, in step S44, the color difference signal correcting circuit 90 generates the corrected color difference signal by multiplying the color difference signal which forms the input image signal by the color difference gain coefficient calculated in step S42. Or when realizing the above by software processing, the CPU generates the corrected color difference signal by multiplying the color difference signal which forms the input image signal by the color difference gain coefficient. Thus, in step S44, the color difference component of the image signal is corrected such that the value of the xy chromaticity does not change before and after correction in the luminance component correcting step.

The luminance signal Y1 and the color difference signals U1 and V1 corrected by the image processing unit 30 are output to the projection unit 100. The projection unit 100 can modulate the light from the light source on the basis of the luminance signal Y1 and the color difference signals U1 and V1 and project the modulated light onto the screen SCR.

Figure 17:
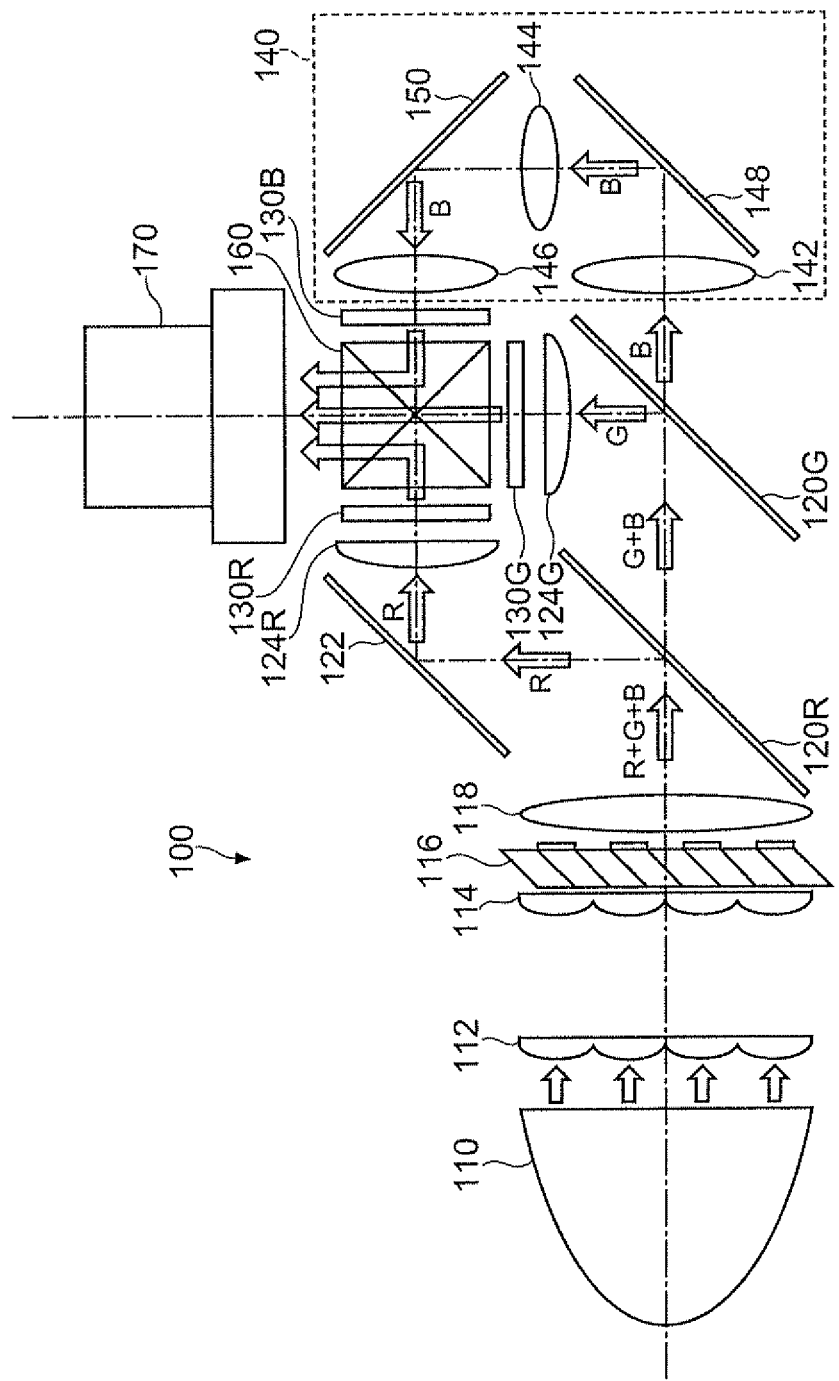
FIG. 17 is a view illustrating an example of the configuration of a projection unit in FIG. 1.

FIG. 17 is a view illustrating an example of the configuration of the projection unit 100 in FIG. 1. In FIG. 17, an explanation is made assuming the projection unit 100 in the first embodiment is formed from a so-called three plate type liquid crystal projector. However, the projection unit of the image display device of the invention is not limited to being formed from the so-called three plate type liquid crystal projector. That is, the following explanation will be made assuming that one pixel is formed by an R-component sub-pixel, a G-component sub-pixel, and a B-component sub-pixel. However, the number of sub-pixels (the number of color components) which form one pixel is not limited thereto.

Moreover, in FIG. 17, it is assumed that the luminance signal Y1 and the color difference signals U1 and V1, which are input from the image processing unit 30, are converted into image signals of the respective color components of RGB and then the light from the light source is modulated for every color component. In this case, a circuit for conversion into the RGB signals may be provided in the image processing unit 30 or may be provided in the projection unit 100.

The projection unit 100 in the first embodiment includes a light source 110, integrator lenses 112 and 114, a polarization conversion device 116, a superposition lens 118, a dichroic mirror 120R for R, a dichroic mirror 120G for G, a reflecting mirror 122, a field lens 124R for R, a field lens 124G for G, a liquid crystal panel 130R (first light modulating device) for R, a liquid crystal panel 130G (second light modulating device) for G, a liquid crystal panel 130E (third light modulating device) for B, a relay optical system 140, a cross dichroic prism 160, and a projection lens 170. Liquid crystal panels used as the liquid crystal panel 130R for R, the liquid crystal panel 130G for G, and the liquid crystal panel 130B for B are transmissive liquid crystal display devices. The relay optical system 140 includes relay lenses 142, 144, and 146 and reflecting mirrors 148 and 150.

The light source 110 is formed from an ultrahigh-pressure mercury lamp, for example, and emits light including at least R-component light, G-component light, and B-component light. The integrator lens 112 has a plurality of small lenses for dividing light from the light source 110 into a plurality of partial light components. The integrator lens 114 has a plurality of small lenses corresponding to the plurality of small lenses of the integrator lens 112. The superposition lens 118 superimposes partial light components emitted from the plurality of small lenses of the integrator lens 112 on the liquid crystal panel.

In addition, the polarization conversion device 116 has a polarizing beam splitter array and a λ/2 plate and converts light from the light source 110 into approximately one kind of polarized light. The polarizing beam splitter array has a structure in which a polarized light separating film, which divides partial light components divided by the integrator lens 112 into p-polarized light and s-polarized light, and a reflecting film, which changes the direction of the light from the polarized light separating film, are alternately arrayed. Polarization directions of two kinds of polarized light components separated by the polarized light separating film are aligned by the λ/2 plate. The light converted into approximately one kind of polarized light by the polarization conversion device 116 is irradiated to the superposition lens 118.

The light from the superposition lens 118 is incident on the dichroic mirror 120R for R. The dichroic mirror 120R for R has a function for reflecting R-component light and allowing G-component light and B-component light to pass through. Light transmitted through the dichroic mirror 120R for R is irradiated to the dichroic mirror 120G for G, and light reflected by the dichroic mirror 120B for R is reflected by the reflecting mirror 122 and is guided to the field lens 124R for R.

The dichroic mirror 120G for G has a function for reflecting G-component light and allowing B-component light to pass through. Light transmitted through the dichroic mirror 120G for G is incident on the relay optical system 140, and light reflected by the dichroic mirror 120G for G is guided to the field lens 124G for G.

In the relay optical system 140, in order to make the difference between the optical path length of the B-component light transmitted through the dichroic mirror 120G for G and the optical path length of the other R-component and G-component light as small as possible, the relay lenses 142, 144, and 146 are used to correct the differences in the optical path lengths. Light transmitted through the relay lens 142 is guided to the relay lens 144 by the reflecting mirror 148. Light transmitted through the relay lens 144 is guided to the relay lens 146 by the reflecting mirror 150. Light transmitted through the relay lens 146 is irradiated to the liquid crystal panel 130B for B.

Light irradiated to the field lens 124R for R is converted into parallel beams to be incident on the liquid crystal panel 130R for R. The liquid crystal panel 130R for R functions as a light modulating device (light modulating section), and the transmittance (passing rate, modulation rate) is set to change on the basis of an image signal for R. Therefore, light (light of a first color component) incident on the liquid crystal panel 130R for R is modulated on the basis of the image signal for R, and the modulated light is incident on the cross dichroic prism 160.

Light irradiated to the field lens 124G for G is converted into parallel beams to be incident on the liquid crystal panel 130G for G. The liquid crystal panel 130G for G functions as a light modulating device (light modulating section), and the transmittance (passing rate, modulation rate) is set to change on the basis of an image signal for G. Therefore, light (light of a second color component) incident on the liquid crystal panel 130G for G is modulated on the basis of the image signal for G, and the modulated light is incident on the cross dichroic prism 160.

The liquid crystal panel 130B for B to which light converted into parallel beams is irradiated by the relay lenses 142, 144, and 146 functions as a light modulating device (light modulating section), and the transmittance (passing rate, modulation rate) is set to change on the basis of an image signal for B. Therefore, light (light of a third color component) incident on the liquid crystal panel 130B for B is modulated on the basis of the image signal for B, and the modulated light is incident on the cross dichroic prism 160.

The liquid crystal panel 130R for R, the liquid crystal panel 130G for G, and the liquid crystal panel 130B for B have the same configuration. Each liquid crystal panel is formed by sealing liquid crystal, which is an electro-optical material, between a pair of transparent glass substrates. In each liquid crystal panel, the passing rate of each color light is changed corresponding to the image signal of each sub-pixel, for example, using a polysilicon thin film transistor as a switching element.

In the first embodiment, the liquid crystal panel as a light modulating device is provided for every color component which forms one pixel, and the transmittance of each liquid crystal panel is controlled by the image signal corresponding to the sub-pixel. That is, the image signal for an R-component sub-pixel is used to control the transmittance (passing rate, modulation rate) of the liquid crystal panel 130R for R, the image signal for a G-component sub-pixel is used to control the transmittance (passing rate, modulation rate) of the liquid crystal panel 130G for G, and the image signal for a B-component sub-pixel is used to control the transmittance (passing rate, modulation rate) of the liquid crystal panel 130B for B.

The cross dichroic prism 160 has a function of outputting mixed light, in which incident light from the liquid crystal panel 130R for R, the liquid crystal panel 130G for G, and the liquid crystal panel 130E for B is mixed, as emitted light. The projection lens 170 is a lens which forms an output image on the screen SCR in an enlarged manner.

By controlling the projection unit 100 as an image display step after the performing of the gray level correction processing in the first embodiment so that the image is displayed on the basis of the image signal corrected in the gray level correction processing, an image display method can be provided which is capable of improving the expression of the detail of the image without affecting the other luminance regions.

As described above, according to the first embodiment, not only is the luminance signal corrected, but also the color difference signal is corrected simultaneously with the luminance signal. In this case, for the luminance signal, only a predetermined luminance level range is corrected in a predetermined spatial frequency band.

Second Embodiment

Although the ratio of the outputs FO1 to FO3 of the first to third filter circuits 42, 44, and 46 which form the multi-stage filter circuit 40 cannot be changed in the first embodiment, the invention is not limited thereto. In a second embodiment of the invention, the ratio of the outputs FO1 to FO3 of the first to third filter circuits 42, 44, and 46 which form the multi-stage filter circuit 40 may be changed according to the output highY of the HPF circuit 73.

The point that an image processing unit in the second embodiment is different from the image processing unit 30 in the first embodiment is the configuration of the luminance signal correction amount calculating circuit. Accordingly, illustration and explanation on the same point as in the first embodiment are omitted below, and the luminance signal correction amount calculating circuit of the image processing unit in the second embodiment will be described.

Figure 18:
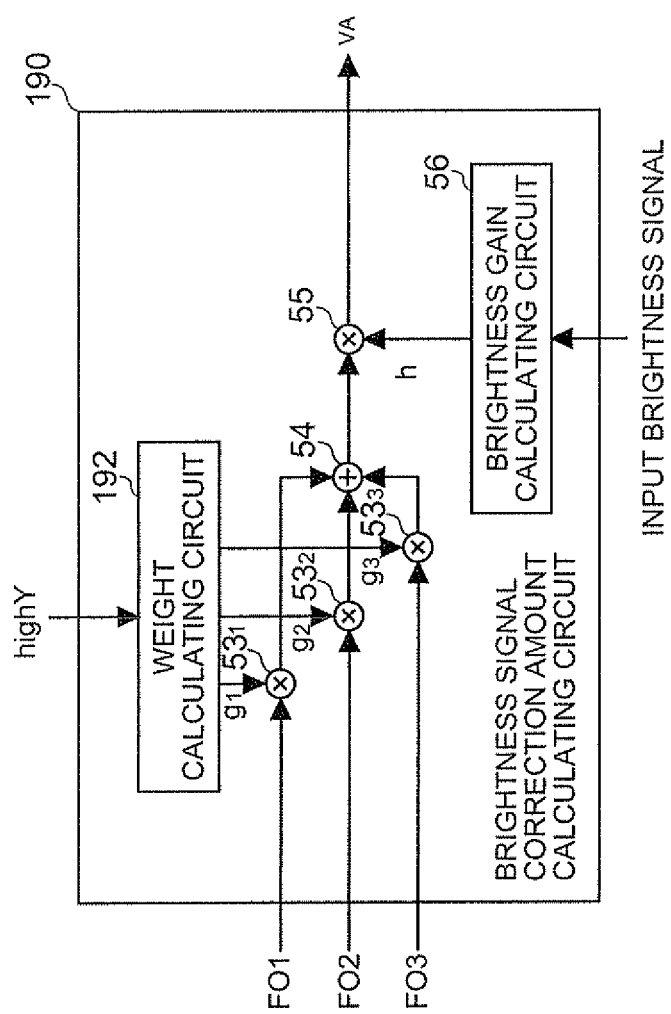
FIG. 18 is a block diagram illustrating an example of the configuration of a luminance signal correction amount calculating circuit in a second embodiment.

FIG. 18 is a block diagram illustrating an example of the configuration of the luminance signal correction amount calculating circuit in the second embodiment of the invention. In FIG. 18, the same sections as in FIG. 10 are denoted by the same reference numerals, and the explanation will be appropriately omitted.

FIG. 19 is a view for explaining an operation of a weight calculating circuit 192 in FIG. 18.

A luminance signal correction amount calculating circuit 190 in the second embodiment includes the weight calculating circuit 192, multipliers $53_1$ to $53_3$, an adder 54, a multiplier 55, and a luminance gain calculating circuit 56.

The output highY generated by the HPF circuit 73 of the high frequency component extracting circuit 72 of the frequency analysis circuit 70 is input to the weight calculating circuit 192. In addition, the weight calculating circuit 192 calculates the weight coefficients $g_1$ to $g_3$ according to the output highY from the HPF circuit 73, as shown in FIG. 19.

Such a weight calculating circuit 192 is realized by the LUT which has the output highY from the HPF circuit 73 as the input and has the weight coefficients $g_1$ to $g_3$ as the output. For this reason, weight coefficients $(g_1a, g_2a, g_3a)$, $(g_1b, g_2b, g_3b)$, $(g_1c, g_2c, g_3c)$, ... which correspond to the output highY from the HPF circuit 73 are stored beforehand in the weight calculating circuit 192, such that the weight coefficient corresponding to the output highY is output when the output highY is input from the HPF circuit 73.

The weight coefficient $g_1$ is input to the multiplier $53_1$ to which the output FO1 of the first filter circuit 42 is input. The multiplier $53_1$ outputs a result, which is obtained by multiplying the output FO1 of the first filter circuit 42 by the weight coefficient $g_1$, to the adder 54.

The weight coefficient $g_2$ is input to the multiplier $53_2$ to which the output FO2 of the second filter circuit 44 is input. The multiplier $53_2$ outputs a result, which is obtained by multiplying the output FO2 of the second filter circuit 44 by the weight coefficient $g_2$, to the adder 54.

The weight coefficient $g_3$ is input to the multiplier $53_3$ to which the output FO3 of the third filter circuit 46 is input. The multiplier $53_3$ outputs a result, which is obtained by multiplying the output FO3 of the third filter circuit 46 by the weight coefficient $g_3$, to the adder 54.

The adder 54 adds the multiplication results of the multipliers $53_1$ to $53_3$ and outputs the addition result to the multiplier 55. The luminance gain coefficient h calculated by the luminance gain calculating circuit 56 is input to the multiplier 55. Moreover, the output of the multiplier 55 is output as the correction signal VA. The correction signal VA is input to the luminance signal correcting circuit 60.

Thus, the luminance signal correction amount calculating circuit 190 can calculate the amount of correction of the luminance signal on the basis of the output highY from the HPF circuit 73, the signal in the predetermined spatial frequency band extracted by the multi-stage filter circuit 40 (in a broad sense, a signal extracting circuit), and the luminance gain coefficient. In addition, the luminance signal correcting circuit 60 outputs the corrected luminance signal Y1 by adding the correction signal VA from the luminance signal correction amount calculating circuit 190 to the luminance signal which forms the input image signal or the luminance signal from which the luminance noise component has been removed, for example.

Figure 20:
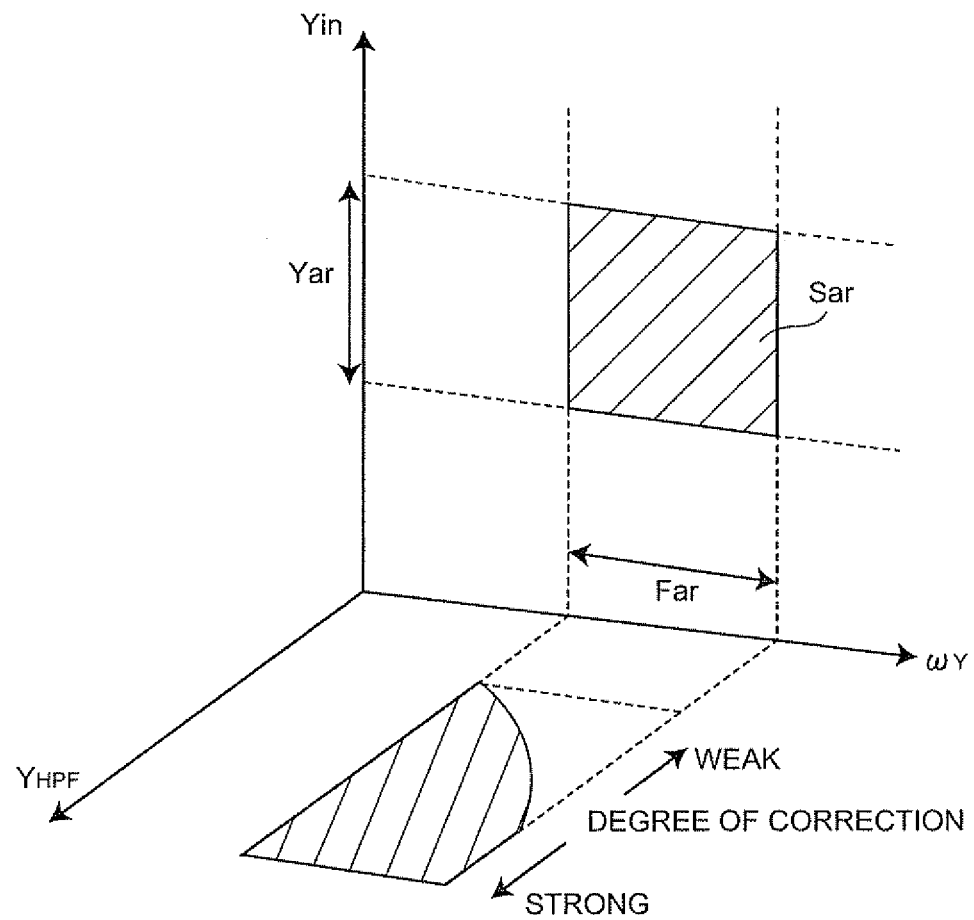
FIG. 20 is a view for explaining an operation of an image processing unit in the second embodiment.

FIG. 20 is a view for explaining an operation of the image processing unit in the second embodiment. In FIG. 20, the same sections as in FIG. 3 are denoted by the same reference numerals, and the explanation will be appropriately omitted.

In the second embodiment, similar to the first embodiment, a spatial frequency of a luminance component of an image signal is analyzed, the amount of correction of the luminance component of the image signal is calculated according to the analysis result of the spatial frequency of the luminance component of the image signal only in a spatial frequency band Far (predetermined spatial frequency band), and the luminance component of the image signal is corrected by using the amount of correction. In this case, the degree of gray level correction is made to change according to a high frequency component of a luminance component of an input image signal. Moreover, in the second embodiment, the ratio of the outputs FO1 to FO3 of the first to third filter circuits 42, 44, and 46 which form the multi-stage filter circuit 40 can be changed. Accordingly, as shown in FIG. 20, the luminance signal can be extracted such that the spatial frequency band becomes narrow as the level of the high frequency component becomes small and the luminance noise accordingly increases. In addition, only the detail of a dark portion can be amplified by applying the luminance gain such that the gain is increased with low luminance.

Thus, according to the second embodiment, in addition to effects of the first embodiment, the spatial frequency band extracted corresponding to the amount of luminance noises can be made narrow. As a result, it is possible to prevent a luminance noise existing in the high frequency band from being amplified.

Third Embodiment

In the image processing unit 30 of the first or second embodiment, the luminance signal correction amount calculating circuit is configured to include the weight coefficient storage circuit 52 or the weight calculating circuit 192 and the luminance gain calculating circuit 56 and to generate the correction signal VA by the multiplier which performs multiplication of the weight coefficient or the luminance gain coefficient. However, the invention is not limited to the configuration.

Figure 21:
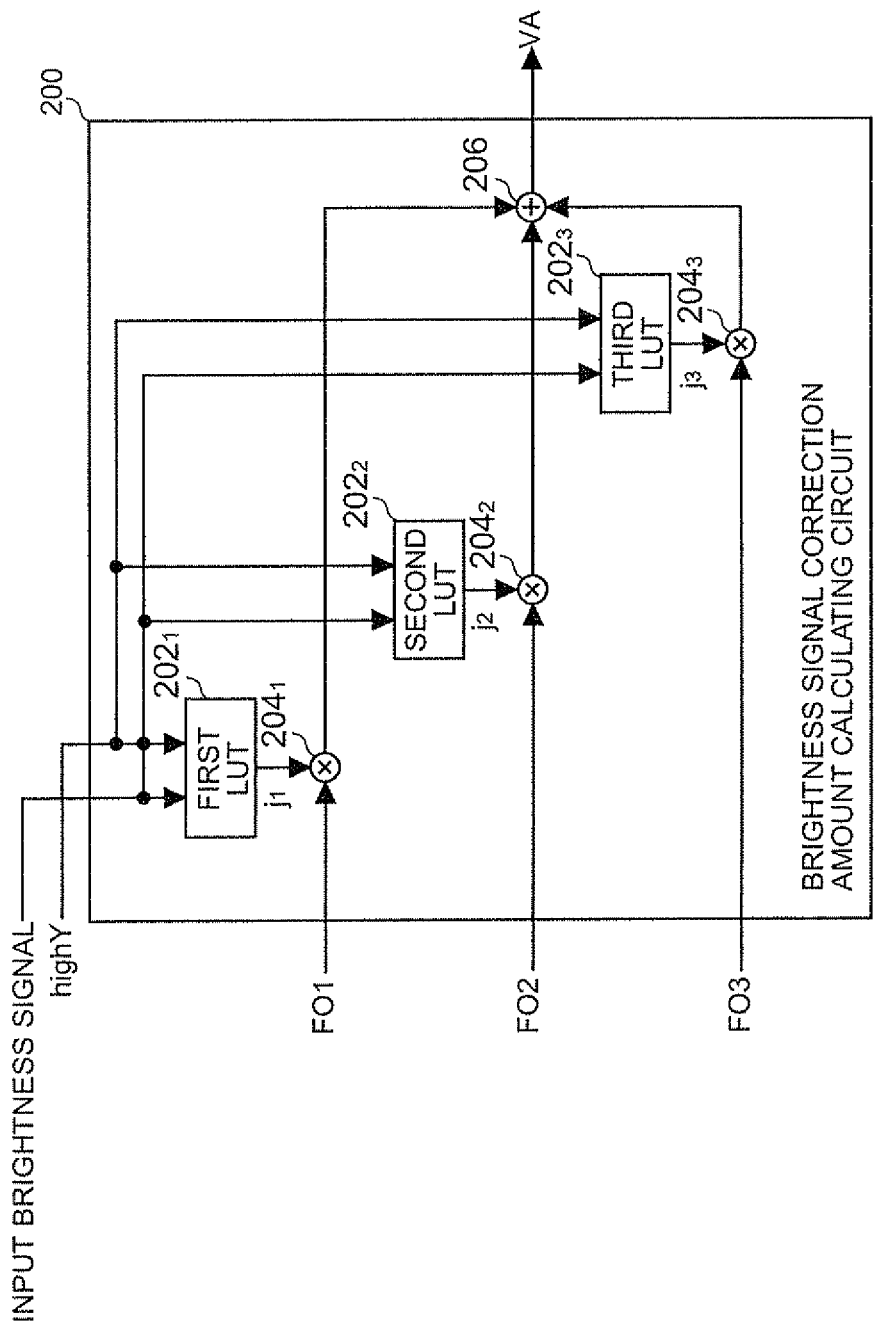
FIG. 21 is a block diagram illustrating an example of the configuration of a luminance signal correction amount calculating circuit in a third embodiment of the invention.

FIG. 21 is a block diagram illustrating an example of the configuration of a luminance signal correction amount calculating circuit 200 in a third embodiment of the invention. For example, instead of the luminance signal correction amount calculating circuit 50 in the first embodiment, the luminance signal correction amount calculating circuit 200 shown in FIG. 21 is built in the image processing unit 30 in FIG. 4.

The luminance signal correction amount calculating circuit 200 includes first to third LUTs $202_1$ to $202_3$, multipliers $204_1$ to $204_3$, and an adder 206. A luminance signal which forms an input image signal and the output highY from the HPF circuit 73 are input to each of the first to third LUTs $202_1$ to $202_3$. In each LUT, the luminance gain coefficient is stored corresponding to the combination of the luminance signal which forms the input image signal and the output highY from the HPF circuit 73. The luminance signal correction amount calculating circuit 200 multiplies each output of the multi-stage filter circuit 40 by the luminance gain coefficient from each of the first to third LUTs $202_1$ to $202_3$ and then adds the multiplication results and outputs it as the correction signal VA.

FIGS. 22A to 22C are views for explaining operations of the first to third LUTs $202_1$ to $202_3$ in FIG. 21.

As shown in FIG. 22A, a luminance signal which forms an input image signal and the output highY from the HPF circuit 73 are input to the first LUT $202_1$, and a luminance gain coefficient $j_1$ corresponding to the combination of the luminance signal and the output highY are output from the first LUT $202_1$. For this reason, luminance gain coefficients $j_1a$, $j_1b$, $j_1c$, . . . corresponding to the combination of the luminance signal and the output highY are stored beforehand in the first LUT $202_1$, such that the luminance gain coefficient corresponding to the combination of the luminance signal and the output highY from the HPF circuit 73 is output as the luminance gain coefficient $j_1$ when the luminance signal and the output highY are input.

As shown in FIG. 22B, a luminance signal which forms an input image signal and the output highY from the HPF circuit 73 are input to the second LUT $202_2$, and a luminance gain coefficient $j_2$ corresponding to the combination of the luminance signal and the output highY is output from the second LUT $202_2$. For this reason, luminance gain coefficients $j_2a$, $j_2b$, $j_2c$, corresponding to the combination of the luminance signal and the output highY are stored beforehand in the second LUT $202_2$, such that the luminance gain coefficient corresponding to the combination of the luminance signal and the output highY from the HPF circuit 73 is output as the luminance gain coefficient $j_2$ when the luminance signal and the output highY are input.

As shown in FIG. 22C, a luminance signal which forms an input image signal and the output highY from the HPF circuit 73 are input to the third LUT $202_3$, and a luminance gain coefficient $j_3$ corresponding to the combination of the luminance signal and the output highY is output from the third LUT $202_3$. For this reason, luminance gain coefficients $j_3a$, $j_3b$, $j_3c$, . . . corresponding to the combination of the luminance signal and the output highY are stored beforehand in the third LUT $202_3$, such that the luminance gain coefficient corresponding to the combination of the luminance signal and the output highY from the HPF circuit 73 is output as the luminance gain coefficient $j_3$ when the luminance signal and the output highY are input.

In FIG. 21, the multiplier $204_1$ performs multiplication of an output FO1 of the first filter circuit 42, which forms the multi stage filter circuit 40, and the luminance gain coefficient $j_1$ from the first LUT $202_1$ and outputs the multiplication result to the adder 206. The multiplier $204_2$ performs multiplication of an output FO2 of the second filter circuit 44, which forms the multi-stage filter circuit 40, and the luminance gain coefficient $j_2$ from the second LUT $202_2$ and outputs the multiplication result to the adder 206. The multiplier $204_3$ performs multiplication of an output FO3 of the third filter circuit 46, which forms the multi-stage filter circuit 40, and the luminance gain coefficient $j_3$ from the third LUT $202_3$ and outputs the multiplication result to the adder 206.

The adder 206 adds the multiplication results of the multipliers $204_1$ to $204_3$ and outputs the addition result as the correction signal VA.

As described above, the image processing unit in the third embodiment includes the multi-stage filter circuit 40 which extracts a signal in a predetermined spatial frequency band from the luminance component of an image signal. The luminance signal correction amount calculating circuit 200 includes: a plurality of tables which is provided for every output of the multi-stage filter circuit 40 and outputs the gain corresponding to the level of a luminance component before correction; a plurality of multipliers which is provided for every output of the multi-stage filter circuit 40 and performs multiplication of the output of the multi-stage filter circuit 40 and the output of each of the plurality of tables; and an adder which adds the multiplication results of the plurality of multipliers. The luminance signal correction amount calculating circuit 200 can calculate the output of the adder as the amount of correction of the luminance component.

Also in the third embodiment, not only can the luminance signal be corrected, but also the color difference signal can be corrected simultaneously with the luminance signal, similar to the first or second embodiment.

According to the third embodiment, the number of multipliers provided in the luminance signal correction amount calculating circuit can be reduced compared with that in the first or second embodiment. As a result, it becomes possible to reduce power consumption and cost.

Fourth Embodiment

The luminance signal correction amount calculating circuit 200 in the third embodiment is configured to include the first to third LUTs $202_1$ to $202_3$, the multipliers $204_1$ to $204_3$, and the adder 206 and to add the multiplication results of the multipliers using the luminance gain coefficients from the first to third LUTs $202_1$ to $202_3$, as shown in FIG. 21. However, the invention is not limited to the configuration.

Figure 23:
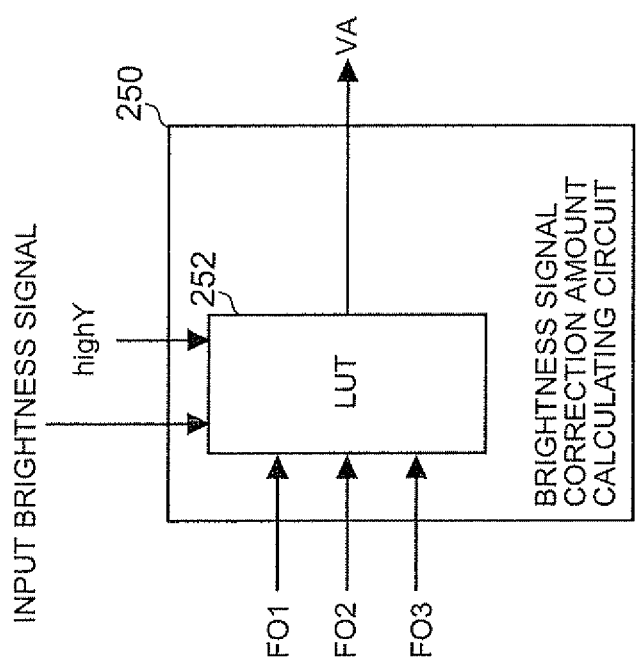
FIG. 23 is a block diagram illustrating an example of the configuration of a luminance signal correction amount calculating circuit in a fourth embodiment of the invention.
Figure 25:
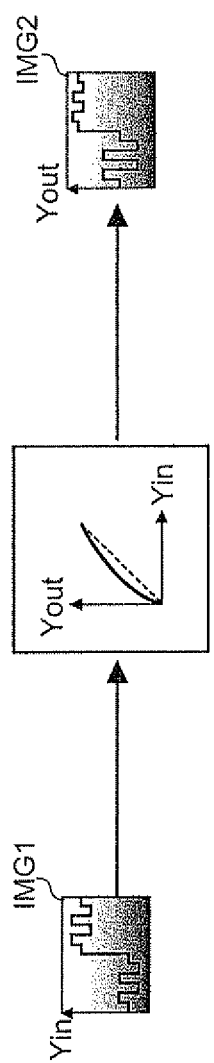
FIG. 25 is a view for explaining the known gray level correction processing.

FIG. 23 is a block diagram illustrating an example of the configuration of a luminance signal correction amount calculating circuit 250 in a fourth embodiment of the invention. For example, instead of the luminance signal correction amount calculating circuit 50 in the first embodiment, the luminance signal correction amount calculating circuit 250 shown in FIG. 23 is built in the image processing unit 30 in FIG. 4.

The luminance signal correction amount calculating circuit 250 includes an LUT 252. The luminance signal correction amount calculating circuit 250 outputs the output from the LUT 252 as a correction signal VA.

FIG. 24 is a view for explaining an operation of the LUT 252 in FIG. 23.

A luminance signal which forms an input image signal, the output highY from the HPF circuit 73, and outputs FO1 to FO3 of first to third filter circuits 42 to 44 which form the multi-stage filter circuit 40 are input to the LUT 252, and the amount of correction corresponding to the combination of the luminance signal, the output highY, and the outputs of the filter circuits is output from the LUT 252. This amount of correction is output as the correction signal VA. For this reason, the amounts of correction VAa, VAb, . . . , VAc, VAd, VAe, . . . corresponding to the combination of the luminance signal, the output highY, and the outputs FO1 to FO3 of the filter circuits are stored beforehand in the LUT 252, such that the amount of correction corresponding to the combination is output when the luminance signal, the output highY, and the outputs of the filter circuits are input.

Also in the fourth embodiment, not only can the luminance signal be corrected, but also the color difference signal can be corrected simultaneously with the luminance signal, similar to the first or second embodiment.

According to the fourth embodiment, the multipliers and the adder provided in the luminance signal correction amount calculating circuit can be removed compared with the first or second embodiment. As a result, it becomes possible to significantly reduce power consumption and cost.

Having described the image processor, the image display device, and the image processing method of the invention on the basis of the above embodiments, the invention is not limited to the above-described embodiments, and various modifications thereof may be made within the scope without departing from the subject matter or spirit of the invention. For example, the following modifications may also be made.

(1) in each of the embodiments described above, the projector was used as an example of the image display device. However, the invention is not limited thereto. The image display device of the invention may also be applied to all kinds of devices which perform image display, such as a liquid crystal display device, a plasma display device, and an organic EL display device.

(2) In each of the embodiments described above, the light valve using a transmissive liquid crystal panel was used as a light modulating device. However, the invention is not limited thereto. For example, a DLP (digital light processing; registered trademark), a LCOS (liquid crystal on silicon), and the like may be adopted as light modulating devices.

(3) In each of the embodiments described above, the light valve using a so-called three plate type transmissive liquid crystal panel was used as an example of the light modulating device. However, a light valve using a single plate type liquid crystal panel or a two or four or more plate type transmissive liquid crystal panel may also be adopted.

(4) In each of the embodiments described above, one pixel was formed by sub-pixels of three color components. However, the invention is not limited thereto. The number of color components which form one pixel may be 2 or 4 or more.

(5) In each of the embodiments described above, the luminance gain and the frequency gain are calculated. However, the invention is not limited thereto. That is, when correcting an input luminance signal, it may be possible to calculate at least one of the luminance gain and the frequency gain and to correct the input luminance signal using the calculation result.

(6) In each of the embodiments described above, the invention was described as the image processor, the image display device, and the image processing method. However, the invention is not limited thereto. For example, the invention may be an image display system including the image processor or the image display device. In addition, for example, the invention may be a program, in which the procedure of the processing method (image processing method) of the image processor for realizing the invention is described, or a recording medium recorded with the program.

The entire disclosure of Japanese Patent Application No. 2008-290664, filed Nov. 13, 2008 is expressly incorporated by reference herein.

What is claimed is:

1. An image processor that corrects an image signal, comprising:
    a frequency analysis section that analyzes a spatial frequency of a luminance component of the image signal;
    a luminance component correction amount calculating section that calculates an amount of correction of the luminance component of the image signal according to the analysis result of the frequency analysis section only for an image signal in a predetermined luminance level range of a predetermined spatial frequency band; and
    a luminance component correcting section that corrects the luminance component of the image signal by using the amount of correction calculated by the luminance component correction amount calculating section, wherein
    the frequency analysis section includes a high frequency component extracting section that extracts a predetermined high frequency component of the luminance component of the image signal, and
    the luminance component correction amount calculating section includes a frequency gain calculating section, which calculates a frequency gain corresponding to the high frequency component extracted by the high frequency component extracting section, and calculates the amount of correction of the luminance component on the basis of the luminance component in the predetermined luminance level range of the spatial frequency band and the frequency gain calculated by the frequency gain calculating section.

2. The image processor according to claim 1, wherein the luminance component correction amount calculating section includes a luminance gain calculating section, which calculates a luminance gain corresponding to the level of the luminance component of the image signal, and calculates the amount of correction of the luminance component on the basis of a signal in the spatial frequency band, the frequency gain, and the luminance gain calculated by the luminance gain calculating section.

3. The image processor according to claim 1, further comprising:
a signal extracting section that extracts a signal in the spatial frequency band from the luminance component of the image signal.

4. The image processor according to claim 1, wherein the frequency analysis section includes a luminance noise removing section that removes a predetermined luminance noise component from the luminance component of the image signal, and
the luminance component correcting section corrects the luminance component of the image signal, from which the luminance noise component has been removed by the luminance noise removing section, by using the amount of correction.

5. The image processor according to claim 1, further comprising:
a color difference component correcting section that corrects a color difference component of the image signal such that the value of the xy chromaticity does not change before and after correction using the luminance component correcting section.

6. The image processor according to claim 5, further comprising:
a color difference component correction amount calculating section which calculates the amount of correction of the color difference component of the image signal such that the value of the xy chromaticity does not change, on the basis of luminance components of the image signal before and after correction using the luminance component correcting section,
wherein the color difference component correcting section corrects the color difference component of the image signal using the amount of correction of the color difference component calculated by the color difference component correction amount calculating section.

7. The image processor according to claim 6, further comprising:
an adjustment parameter storage section that stores an adjustment parameter of the color difference component,
wherein assuming that the luminance component before correction is Yin, the luminance component after correction is Yout, and the adjustment parameter is b, the color difference component correcting section corrects the color difference component by multiplying the color difference component of the image signal by a color difference gain of $(1-b \times (1-Yout/Yin))$.

8. An image display device that displays an image on the basis of an image signal, comprising:
the image processor according to claim 1 that corrects the image signal; and
an image display unit that displays an image on the basis of the image signal corrected by the image processor.

9. An image processing method of correcting an image signal, comprising:
analyzing a spatial frequency of a luminance component of the image signal;
calculating, performed by a processor, an amount of correction of the luminance component of the image signal according to the analysis result in the analyzing of the frequency only for an image signal in a predetermined luminance level range of a predetermined spatial frequency band; and
correcting the luminance component of the image signal by using the amount of correction calculated in the calculating of the amount of correction of the luminance component, wherein
the analyzing of the frequency includes extracting a predetermined high frequency component of the luminance component of the image signal, and
in the calculating of the amount of correction of the luminance component, calculating a frequency gain corresponding to the high frequency component extracted in the extracting of the high frequency component is included, and the amount of correction of the luminance component is calculated on the basis of the luminance component in the predetermined luminance level range of the spatial frequency band and the frequency gain calculated in the calculating of the frequency gain.

10. The image processing method according to claim 9, wherein in the calculating of the amount of correction of the luminance component, calculating a luminance gain corresponding to the level of the luminance component of the image signal is included, and the amount of correction of the luminance component is calculated on the basis of a signal in the spatial frequency band, the frequency gain, and the luminance gain calculated in the calculating of the luminance gain.

11. The image processing method according to claim 9, wherein the analyzing of the frequency includes removing a luminance noise component from the luminance component of the image signal, and
in the correcting of the luminance component, the luminance component of the image signal from which the luminance noise component has been removed in the removing of the luminance noise component is corrected by using the amount of correction.

12. The image processing method according to claim 9, further comprising:
correcting a color difference component of the image signal such that the value of the xy chromaticity does not change before and after the correcting of the luminance component.

13. The image processing method according to claim 12, further comprising:
calculating the amount of correction of the color difference component of the image signal such that the value of the xy chromaticity does not change, on the basis of luminance components of the image signal before and after the correcting of the luminance component,
wherein in the correcting of the color difference component, the color difference component of the image signal is corrected using the amount of correction of the color difference component calculated in the calculating of the amount of correction of the color difference component.

* * * * *